United States Patent
Garahi et al.

(10) Patent No.: US 6,674,448 B1
(45) Date of Patent: Jan. 6, 2004

(54) INTERACTIVE WAGERING SYSTEM WITH CONTROLLABLE GRAPHIC DISPLAYS

(75) Inventors: Masood Garahi, Superior, CO (US); Connie T. Marshall, Muskogee, OK (US)

(73) Assignee: ODS Properties, Inc., Los Angeles, CA (US)

( * ) Notice: Subject to any disclaimer, the term of this patent is extended or adjusted under 35 U.S.C. 154(b) by 505 days.

(21) Appl. No.: 09/632,049

(22) Filed: Aug. 3, 2000

Related U.S. Application Data

(60) Provisional application No. 60/194,856, filed on Apr. 5, 2000.

(51) Int. Cl.⁷ .................................................. G06F 3/14
(52) U.S. Cl. ............................ 345/719; 463/25; 705/16
(58) Field of Search ........................... 345/719; 463/25, 463/42; 705/16, 18

(56) References Cited

U.S. PATENT DOCUMENTS

| | | |
|---|---|---|
| 3,909,002 A | 9/1975 | Levy |
| 4,033,588 A | 7/1977 | Watts |
| 4,108,361 A | 8/1978 | Krause ........................ 235/375 |
| 4,322,612 A | 3/1982 | Lange ......................... 235/419 |
| 4,339,798 A | 7/1982 | Hedges et al. |
| 4,372,558 A | 2/1983 | Shimamoto et al. ........ 273/238 |
| 4,494,197 A | 1/1985 | Troy et al. |
| 4,593,904 A | 6/1986 | Graves ....................... 273/1 E |
| 4,626,892 A * | 12/1986 | Nortrup et al. |
| 4,636,951 A | 1/1987 | Harlick ....................... 364/412 |
| 4,652,998 A | 3/1987 | Koza et al. |
| 4,689,742 A | 8/1987 | Troy et al. |
| 4,694,490 A | 9/1987 | Harvey et al. .............. 380/234 |
| 4,704,725 A | 11/1987 | Harvey et al. |
| 4,706,121 A | 11/1987 | Young |
| 4,745,468 A | 5/1988 | Von Kohorn ................ 358/84 |

(List continued on next page.)

FOREIGN PATENT DOCUMENTS

| | | | |
|---|---|---|---|
| EP | 0 387 046 A2 | 9/1990 | ............. G07F/7/02 |
| EP | 0 583 196 A1 | 2/1994 | .......... H04N/7/173 |
| EP | 0 620 688 A2 | 10/1994 | |
| EP | 0 624 039 A2 | 11/1994 | |
| EP | 0 673 004 A2 | 9/1995 | ........... G07F/17/32 |
| EP | 0 873 772 A1 | 10/1998 | ............. A63F/9/22 |
| EP | 0 934 765 A1 | 8/1999 | ............. A63F/9/22 |
| GB | 2 300 535 A | 11/1996 | |
| JP | 01-25659 | 1/1989 | .......... H04M/11/00 |

(List continued on next page.)

OTHER PUBLICATIONS

US 5,823,877, 10/1998, Scagnelli et al. (withdrawn)
Probe XL Brochure, AutoTote Systems, Inc., Newark, Delaware, Sep. 1993.

(List continued on next page.)

*Primary Examiner*—Cao (Kevin) Nguyen
(74) *Attorney, Agent, or Firm*—Fish & Neave; James A. Leiz; Laura A. Sheridan

(57) ABSTRACT

A system is provided in which locally-generated graphics may be displayed on a user's equipment. The user's equipment may be based on a set-top box and television or other user television equipment, a personal computer or handheld computing device or other user computer equipment, or a cellular telephone with a display or other user telephone equipment. The locally-generated graphics may be displayed as an overlay on top of video or as wrap-around graphics on the same screen as a reduced-size video window. The video and the graphics may be related to wagering and in particular may be related to horse racing. The user may interactively wager on horse races with the user equipment.

129 Claims, 11 Drawing Sheets

U.S. PATENT DOCUMENTS

| | | | |
|---|---|---|---|
| 4,764,666 A | 8/1988 | Bergeron | 235/380 |
| 4,799,683 A | 1/1989 | Bruner, Jr. | |
| 4,815,741 A | 3/1989 | Small | 273/138 A |
| 4,882,473 A | 11/1989 | Bergeron et al. | 235/380 |
| 4,922,522 A | 5/1990 | Scanlon | 379/95 |
| 4,926,255 A | 5/1990 | Von Kohorn | 358/84 |
| 4,926,327 A | 5/1990 | Sidley | |
| 4,965,825 A | 10/1990 | Harvey et al. | 380/233 |
| 4,969,183 A | 11/1990 | Reese | 379/88 |
| 4,996,705 A | 2/1991 | Entenmann et al. | 379/91 |
| 5,007,649 A | 4/1991 | Richardson | 273/237 |
| 5,034,807 A | 7/1991 | Von Kohorn | 358/84 |
| 5,054,787 A | 10/1991 | Richardson | 273/369 |
| 5,057,915 A | 10/1991 | Von Kohorn | 358/84 |
| 5,083,271 A | 1/1992 | Thacher et al. | |
| 5,083,272 A | 1/1992 | Walker et al. | 364/412 |
| 5,083,800 A | 1/1992 | Lockton | |
| 5,096,195 A | 3/1992 | Gimmon | 273/138 |
| 5,096,202 A | 3/1992 | Hesland | 273/237 |
| 5,112,050 A | 5/1992 | Koza et al. | 273/139 |
| 5,119,295 A | 6/1992 | Kapur | |
| 5,178,389 A | 1/1993 | Bentley et al. | 273/138 |
| 5,186,471 A | 2/1993 | Vancraeynest | 273/439 |
| 5,218,631 A | 6/1993 | Katz | 463/41 |
| 5,227,874 A | 7/1993 | Von Kohorn | |
| 5,233,654 A | 8/1993 | Harvey et al. | |
| 5,249,044 A | 9/1993 | Von Kohorn | |
| 5,276,312 A | 1/1994 | McCarthy | 235/380 |
| 5,280,426 A | 1/1994 | Edmonds | |
| 5,282,620 A | 2/1994 | Keesee | 273/138 |
| 5,283,734 A | 2/1994 | Von Kohorn | |
| 5,286,023 A | 2/1994 | Wood | 273/138 |
| 5,297,802 A | 3/1994 | Pocock et al. | 273/439 |
| 5,326,104 A | 7/1994 | Pease et al. | 273/138 |
| 5,327,485 A | 7/1994 | Leaden | 379/95 |
| 5,333,868 A | 8/1994 | Goldfarb | 273/138 |
| 5,340,119 A | 8/1994 | Goldfarb | 273/439 |
| 5,351,970 A | 10/1994 | Fioretti | 273/439 |
| 5,354,069 A | 10/1994 | Guttman et al. | 273/439 |
| 5,365,575 A | 11/1994 | Katz | 379/92 |
| 5,398,932 A | 3/1995 | Eberhardt et al. | 273/138 |
| 5,403,999 A | 4/1995 | Entenmann et al. | 235/379 |
| 5,408,417 A | 4/1995 | Wilder | |
| 5,415,416 A | 5/1995 | Scagnelli et al. | |
| 5,417,424 A | 5/1995 | Snowden et al. | 273/138 |
| 5,505,449 A | 4/1996 | Eberhardt et al. | 273/138 |
| 5,507,489 A | 4/1996 | Reibel et al. | 273/138 |
| 5,513,103 A * | 4/1996 | Charlson | |
| 5,518,253 A | 5/1996 | Pocock et al. | 273/439 |
| 5,539,450 A | 7/1996 | Handelman | 348/12 |
| 5,539,822 A | 7/1996 | Lett | 380/20 |
| 5,545,088 A | 8/1996 | Kravitz et al. | 463/40 |
| 5,557,724 A * | 9/1996 | Sampat et al. | |
| 5,564,977 A | 10/1996 | Algie | |
| 5,569,083 A | 10/1996 | Fioretti | 463/19 |
| 5,573,244 A | 11/1996 | Mindes | 463/26 |
| 5,575,474 A | 11/1996 | Rossides | 463/26 |
| 5,577,727 A | 11/1996 | Brame et al. | 273/139 |
| 5,586,937 A | 12/1996 | Menashe | 463/41 |
| 5,589,892 A | 12/1996 | Knee et al. | |
| 5,608,785 A | 3/1997 | Kasday | 379/90 |
| 5,643,088 A | 7/1997 | Vaughn et al. | 463/40 |
| 5,647,795 A | 7/1997 | Stanton | 463/1 |
| 5,679,077 A | 10/1997 | Pocock et al. | 463/19 |
| 5,683,090 A | 11/1997 | Zeile et al. | 273/269 |
| 5,688,174 A | 11/1997 | Kennedy | 463/37 |
| 5,713,795 A | 2/1998 | Kohorn | 463/17 |
| 5,722,890 A | 3/1998 | Libby et al. | 463/17 |
| 5,729,212 A | 3/1998 | Martin | 340/870.28 |
| 5,742,521 A * | 4/1998 | Ellenby et al. | |
| 5,746,657 A | 5/1998 | Ueno | 463/41 |
| 5,749,785 A | 5/1998 | Rossides | 463/25 |
| 5,751,373 A * | 5/1998 | Ohyama et al. | |
| 5,755,621 A | 5/1998 | Marks et al. | 463/42 |
| 5,759,101 A | 6/1998 | Von Kohorn | 463/40 |
| 5,762,552 A | 6/1998 | Vuong et al. | 463/25 |
| 5,772,511 A | 6/1998 | Smeltzer | 463/17 |
| 5,787,156 A | 7/1998 | Katz | 379/93.13 |
| 5,800,268 A | 9/1998 | Molnick | 463/40 |
| 5,816,917 A | 10/1998 | Kelmer et al. | 463/16 |
| 5,816,919 A | 10/1998 | Scagnelli et al. | 463/25 |
| 5,823,879 A | 10/1998 | Goldberg et al. | 463/42 |
| 5,825,353 A * | 10/1998 | Will | |
| 5,830,067 A | 11/1998 | Graves et al. | 463/40 |
| 5,830,068 A * | 11/1998 | Brenner et al. | |
| 5,830,069 A | 11/1998 | Soltesz et al. | 463/42 |
| 5,844,620 A | 12/1998 | Coleman et al. | |
| 5,871,398 A | 2/1999 | Schneier et al. | 463/16 |
| 5,910,047 A | 6/1999 | Scagnelli et al. | 463/17 |
| 5,954,582 A * | 9/1999 | Zach | |
| 5,999,808 A | 12/1999 | LaDue | 455/412 |
| 6,001,016 A | 12/1999 | Walker et al. | 463/42 |
| 6,007,426 A | 12/1999 | Kelly et al. | 463/16 |
| 6,024,640 A | 2/2000 | Walker et al. | 463/17 |
| 6,024,641 A | 2/2000 | Sarno | 463/17 |
| 6,030,288 A | 2/2000 | Davis et al. | 463/29 |
| 6,080,062 A | 6/2000 | Olson | 463/42 |
| 6,080,063 A | 6/2000 | Khosla | 463/42 |
| 6,099,408 A | 8/2000 | Schneier et al. | 463/29 |
| 6,102,797 A | 8/2000 | Kail | 463/16 |
| 6,117,011 A | 9/2000 | Lvov | 463/25 |
| 6,117,013 A | 9/2000 | Eiba | 463/41 |
| 6,152,824 A | 11/2000 | Rothschild et al. | 463/42 |
| 6,186,892 B1 | 2/2001 | Frank et al. | 463/19 |
| 6,203,427 B1 | 3/2001 | Walker et al. | 463/16 |
| 6,251,016 B1 | 6/2001 | Tsuda et al. | 463/42 |
| 6,251,017 B1 | 6/2001 | Leason et al. | 463/42 |
| 6,254,480 B1 | 7/2001 | Zach | 463/17 |
| 6,257,982 B1 | 7/2001 | Rider et al. | 463/31 |
| 6,263,054 B1 | 7/2001 | Haefliger | 379/93.13 |
| 6,264,560 B1 | 7/2001 | Goldberg et al. | 463/42 |
| 6,272,223 B1 | 8/2001 | Carlson | 380/251 |
| 6,273,820 B1 | 8/2001 | Haste, III | 463/40 |
| 6,396,473 B1 * | 5/2002 | Callahan et al. | |
| 2001/0003099 A1 | 6/2001 | Von Kohorn | 463/40 |
| 2001/0003100 A1 | 6/2001 | Yacenda | 463/41 |

FOREIGN PATENT DOCUMENTS

| | | | |
|---|---|---|---|
| JP | 01-269157 | 10/1989 | G06F/15/28 |
| JP | 02-110660 | 4/1990 | G06F/15/28 |
| JP | 02-231671 | 9/1990 | G06F/15/28 |
| JP | 06-325062 | 11/1994 | G06F/15/28 |
| WO | WO 95/01058 | 1/1995 | |
| WO | WO 95/30944 | 11/1995 | |
| WO | WO 97/19428 | 5/1997 | G07F/17/32 |
| WO | WO 98/04991 | 2/1998 | |
| WO | WO 99/17549 | 4/1999 | |
| WO | WO 01/03089 | 1/2001 | G07F/17/32 |

OTHER PUBLICATIONS

Tiny Tim Brochure, AutoTote Systems, Inc., Newark, Delaware, Sep. 1993.

You Bet Help File, Youbet.com, Inc., Los Angeles, California, last modified Jul. 11, 1998, pp. 1–132.

Maury Wolff, "Interactive Wagering A Good Bet," Daily Racing Form, Jan. 29, 1995, p. 4.

John Burgess, "And We're Off To The Races!" The Washington Post, Jan. 16, 1995, pp. 18–19.

Ross Peddicord, "New On TV: You Bet Your Horse," The Sun, Baltimore, Maryland, Dec. 15, 1994.

Yee–Hsiang Chang et al., "An Open–Systems Approach To Video On Demand," IEEE Communications Magazine, May 1994, pp. 68–80.

TruckMaster User's Guide Version 2.0.7, Apr. 1994, AXCIS Pocket Information Network, Inc., Santa Clara, California, pp. 1–122.

* cited by examiner

INTERACTIVE WAGERING SYSTEM WITH CONTROLLABLE GRAPHIC DISPLAYS

This application claims the benefit of U.S. provisional application No. 60/194,856, filed Apr. 5, 2000, which is hereby incorporated by reference herein in its entirety.

BACKGROUND OF THE INVENTION

This invention relates to interactive applications such as interactive television applications, and more particularly, to interactive television systems and interactive wagering systems in which graphics may be displayed for a user.

Interactive television applications that are available or have been proposed include interactive television program guides, video-on-demand applications, home shopping applications, home banking applications, interactive games, etc.

Another suitable type of interactive television application involves interactive wagering. Wagering is a popular leisure activity. For example, many racing fans wager on events such as horse, dog, and harness racing. However, it may be inconvenient to attend racing events in person. Not all racing fans have sufficient time to visit racetracks as often as they would like and some fans have difficulties in obtaining suitable transportation to the track. Off-track betting establishments are available for fans who cannot attend racing events in person, but fans must still travel to the off-track betting establishments.

As a result, interactive television wagering systems have been developed in which fans may place off-track wagers using set-top boxes connected to their televisions. Interactive wagering systems may also be provided that allow users to wager through a personal computer or the like.

It is an object of the present invention to improve interactive television systems and interactive wagering systems by providing arrangements in which graphics may be displayed for a user. For example, graphics may be displayed for a television viewer during a lull in the television programming being provided for the viewer. The graphics may be generated locally at the user's equipment and may be interactive.

SUMMARY OF THE INVENTION

Interactive television and wagering systems are provided in which graphics may be displayed for a user. The graphics may be displayed on user equipment.

The user equipment may be based on a set-top box and television or other user television equipment. For example, a set-top box such as a cable decoder box or satellite receiver may be used to display graphics on an associated television or monitor.

The user equipment may also be based on a personal computer with a television tuner card or the like. If desired, the user equipment may be based on a handheld computing device or other user computer equipment.

The user equipment may be based on user telephone equipment such as a cellular telephone with a display or the like.

Regardless of which type of user equipment is used to display the graphics, the graphics are preferably generated locally by the user equipment, rather than being embedded into a television picture. This allows the user to interact with the graphics. It also allows the locally-generated graphics to be displayed instead of a default set of embedded graphics.

As an example, a television channel may be provided that contains wagering-related or horse-racing-related content. The content may include video clips of horse races, commentary, interviews, etc. Embedded graphics may be included in the video for television viewers that do not have set-top boxes or other equipment that supports user interactivity.

Information for locally-generated graphics (e.g., race results information, handicapping information, advertisements, or any other suitable information) may be provided to the user equipment. This information may be downloaded in advance, may be provided in a continuous data stream in real time, or may be provided on demand (e.g., when requested by the user equipment or when directed by a video production system or the like).

From time to time locally-generated graphics may be displayed with the wagering-related video. For example, the locally-generated graphics may be displayed as an overlay on top of the wagering-related video or may be displayed on the same screen in which the wagering-related video is displayed in a reduced-size window or the like. The locally-generated graphics may be displayed at predetermined intervals (e.g., according to a schedule using a local clock in the user equipment), may be displayed when directed by external control commands (e.g., control commands provided by a video production system or other facility that may be transmitted with the wagering-related video), may be displayed in response to user input, or may be displayed using any other suitable scheme.

The user may interact with the locally-generated graphics. For example, the user may purchase a product displayed in an interactive advertisement, the user may place a wager based on information in the locally-generated graphics, the user may receive additional information (e.g., additional handicapping information), etc.

The user may be provided with screens containing options that allow the user to control the display of the locally-generated graphics. Such options may, for example, allow the user to inhibit the display of the locally-generated graphics, may allow the user to direct the user equipment only to display producer-generated graphics, may allow the user to include user-specified graphics, etc.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
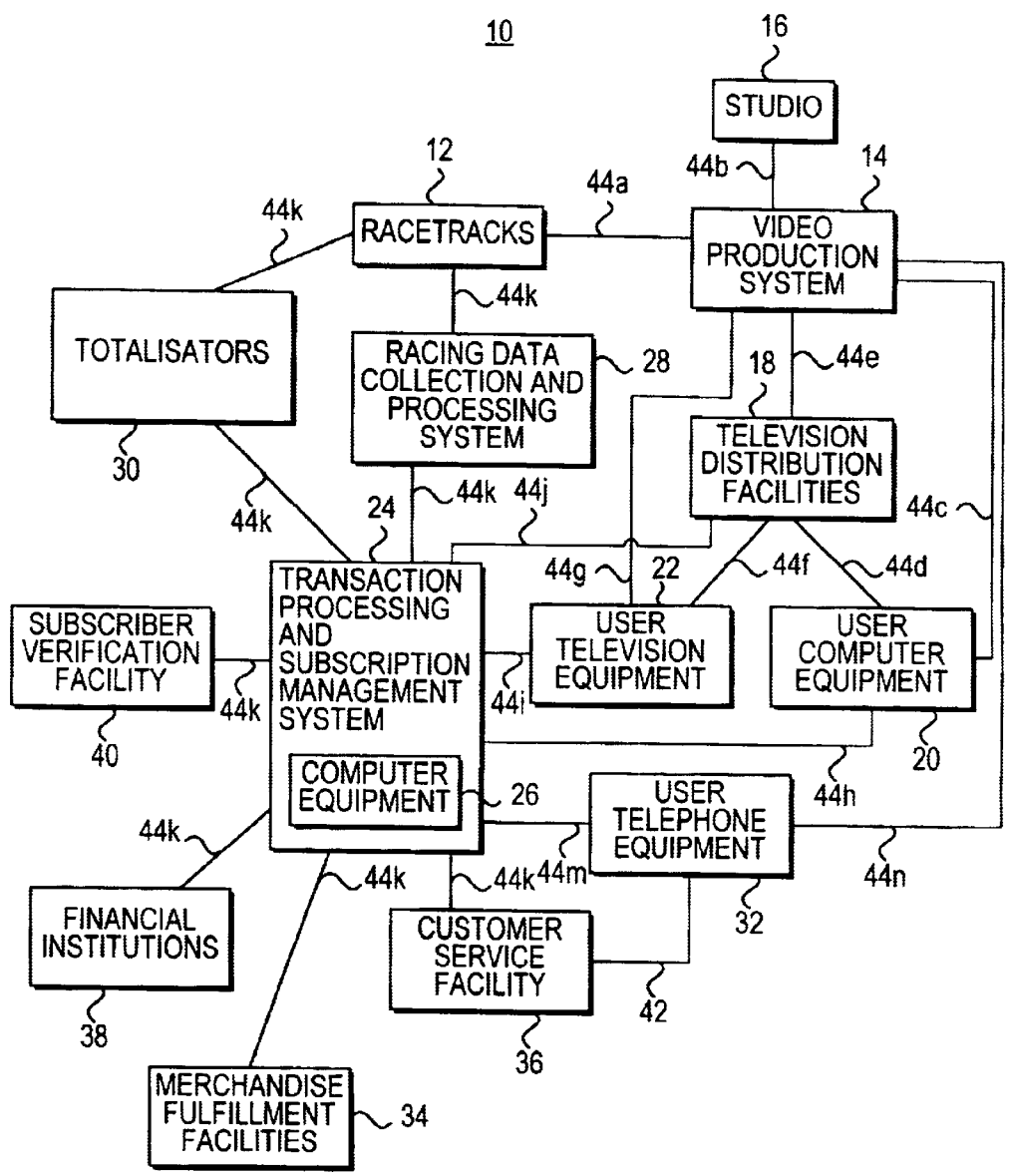
FIG. 1 is a schematic diagram of an illustrative interactive wagering system on which an interactive wagering application may be implemented in accordance with the present invention.

An illustrative system 10 in accordance with the present invention is shown in FIG. 1. Aspects of the invention apply to various types of interactive application. For example, aspects of the invention apply to interactive television systems. Aspects of the invention also apply to interactive wagering systems. The invention is described herein primarily in the context of interactive wagering on races (e.g., horse races) for specificity and clarity.

Races may be run at racetracks 12, which may be located at various geographic locations. Races run at the racetracks may be simulcast to television viewers. For example, simulcast videos may be provided to users with satellite receivers or to off-track betting establishments via satellite.

System 10 may be used to provide an interactive wagering service to users of various user equipment. An interactive wagering application may be used to provide the wagering service. The interactive wagering application may run locally on the user equipment (e.g., on a set-top box, personal computer, electronic book, cellular telephone, handheld computing device, etc.) or may run using a client-server or distributed architecture where some of the application is implemented locally on the user equipment in the form of a client process and some of the application is implemented at a remote location (e.g., on a server computer or other such equipment in the system) as a server process. These arrangements are merely illustrative. Other suitable techniques for implementing the interactive wagering application may be used if desired.

Real-time videos from racetracks 12 may also be provided to video production system 14 for distribution to users as part of a television wagering service (i.e., a wagering-related television channel or Internet-delivered service or the like). If desired, multiple simulcast videos may be provided to video production system 14 in real-time. Talent (e.g., commentators) for the television wagering service provided by the interactive wagering application may be located at studio 16. Studio 16 may provide a video feed containing commentary and the like to video production system 14. Graphic overlays for the television wagering service (i.e., embedded graphics) may be added to the service at video production system 14.

The television wagering service may use video production system 14 to combine selected video segments from desired racing simulcasts with the video feed from studio 16 and suitable graphic overlays. If desired, video production system 14 or a separate facility may be used to reformat simulcasts from racetracks 12. For example, if racetracks 12 provide simulcasts as traditional analog television channels, video production system 14 (or a separate facility) may convert these simulcasts or portions of these simulcasts into digital signals (e.g., digital video signals) or into a different number of analog signals. Digital video signals may require less bandwidth than analog video signals and may be appropriate for situations in which videos are to be transmitted over either high or low bandwidth pathways. Low bandwidth pathways may include telephone lines, the Internet, etc.

Video production system 14 may be used to provide a television wagering service that includes selected simulcast videos, video from studio 16, and graphic overlays to television distribution facilities 18 (for redistribution to user television equipment 22 and user computer equipment 20), to user computer equipment 20, and to user telephone equipment 32 (if user telephone equipment 32 has a display capable of displaying moving images). Television distribution facilities 18 may be any suitable facilities for supplying television to users, such as cable system headends, satellite systems, broadcast television systems, or other suitable systems or combinations of such systems. User computer equipment 20 may be any suitable computer equipment that supports an interactive wagering application. For example, user computer equipment 20 may be a personal computer. User computer equipment 20 may also be based on a mainframe computer, a workstation, a networked computer or computers, a laptop computer, a notebook computer, a handheld computing device such as a personal digital assistant or other small portable computer, etc. One aspect of the invention involves the use of an electronic book platform as user computer equipment 20 or part of user computer equipment 20.

Each of television distribution facilities 18 is typically located at a different geographic location. Users with user television equipment 22 may receive the television wagering service from an associated television distribution facility. User television equipment 22 may include, for example, a television or other suitable monitor. A television may be used to watch the television wagering service on a traditional analog television channel. User television equipment 22 may also include a digital or analog set-top box connected to a television distribution facility 18 by a cable path. A digital set-top box may be used to receive the television wagering service on a digital channel. If desired, user television equipment 22 may contain a satellite receiver, a WebTV box, a personal computer television (PC/TV), or hardware similar to such devices into which set-top box capabilities have been integrated. A recording device such as a videocassette recorder or digital recording device (e.g., a personal video recorder or digital video recorder based on hard disk drives or the like) may be used in user television equipment 22 to store videos. The recording device may be separate from or part of the other components of user television equipment 22.

User computer equipment 20 may receive the television wagering service using a video card or other video-capable equipment to receive analog or digital (e.g., moving picture experts group or MPEG) videos from a television distribution facility. User computer equipment 20 may also receive the television wagering service directly from video production system 14 using, for example, a modem link. If desired, the video for the television wagering service may be compressed (e.g., using MPEG techniques). This may be useful, for example, if the path to user computer equipment 20 is a modem connection using telephone links. If video production system 14 is only used to serve user computer equipment 20 without traditional analog television capabilities, video production system 14 may only need to supply such digitally-compressed video signals and not analog television signals.

Video clips of races and other simulcast information may be provided to users in the form of a television wagering service or by an interactive wagering service provided by the interactive wagering application. If desired, race-related videos may be provided to the user by using video production system 14 or other suitable equipment to route appropriate video clips from the simulcasts to the user in real time. Video clips may also be stored for later viewing. For example, one or more video servers located at racetracks 12, video production system 14, television distribution facilities 18, or other suitable locations may be used to store video clips. The stored videos may then be played back in real time or downloaded for viewing at user television equipment 22, user computer equipment 20, or user telephone equipment 32. The video clips may contain videos of races, commentary, interviews with jockeys, or any other suitable race-related information. If desired, real-time or stored videos may be provided from racetracks 12 directly to user television equipment 22, user computer equipment 20, or user telephone equipment 32 over the Internet or other suitable communications paths without involving video production system 14. Videos may also be provided by routing video signals through equipment located elsewhere in system 10. For example, videos may be routed through transaction processing and subscription management system 24.

Transaction processing and subscription management system 24 may contain computer equipment 26 and other equipment for supporting system functions such as transaction processing (e.g., handling tasks related to wagers, product purchasing, adjusting the amount of funds in user accounts based on the outcomes of wagers, video clip ordering, etc.), data distribution (e.g., for distributing racing data to the users), and subscriber management (e.g., features related to opening an account for a user, closing an account, allowing a user to add or withdraw funds from an account, changing the user's address or personal identification number, etc.). Databases within transaction processing and subscription management system 24 or associated with system 24 may be used to store racing data, wagering data and other transaction data, and subscriber data such as such as information on the user's current account balance, past wagering history, individual wager limits, personal identification number, billing addresses, credit card numbers, bank account numbers, social security numbers, etc. Using such databases may allow the user to access information more quickly and allows for central administration of the wagering service.

If desired, racing videos and other services may be provided using servers and other equipment located at transaction processing and subscription management system 24. For example, video clips may be provided to the user on-demand. Interactive advertisements may be provided to the user. When the user selects a desired advertisement, transaction processing and subscription management system 24 may provide additional information or other services related to the advertisement to the user.

Product ordering services may be implemented using computer equipment at transaction processing and subscriber management system 24 to handle orders and to assist in adjusting the appropriate account of the user accordingly. Orders may be fulfilled using merchandise fulfillment facilities 34. Merchandise fulfillment facilities 34 may be operated solely to provide merchandise fulfillment or may be associated with independently-operated mail-order or on-line businesses. Similar facilities may be used to allow users to order services.

Statistical racing data such as the post times for each race, jockey names, runner names and the number of races associated with each track, handicapping information (e.g., information on past performances such as the number of wins and losses for the past year, etc.), and weather conditions at various tracks may be provided by racing data collection and processing system 28. Some of the data may be collected from racetracks 12 and some may be provided by third party information sources such as Axcis Pocket Information Network, Inc. of Santa Clara, Calif. or other suitable data sources.

Racing data may also be provided from totalisators 30. Totalisators 30 are the computer systems that may be used to handle wagers made at the racetracks, made at off-track betting establishments, and made using interactive wagering system 10. Totalisators 30 generate wagering odds in real time. Totalisators 30 generate these odds based on information on which wagers are being placed (e.g., based on information on which wagers are being placed on races at racetracks 12). Totalisators 30 are available from companies such as Amtote International, Inc. of Hunt Valley, Md. Totalisators 30 may be associated with individual racetracks 12 or groups of racetracks 12. Totalisators 30 may communicate with one another using a communication protocol known as the Intertote Track System Protocol (ITSP). This allows totalisators 30 to share wagering pools. Totalisators may provide racing data including information on the current races at racetracks 12, the number of races associated with each racetrack, win, place, and show odds and pool totals for each horse or other runner, and exacta, trifecta, and quinella payoff predictions and pool totals for every possible combination of runners. Totalisators 30 may also provide current odds and other real-time racing data for other types of wagers. Totalisators 30 may provide the time until post time for each race.

Totalisators 30 may provide race results, such as the order-of-finish list for at least the first three positions and payoff values versus a standard wager amount for win, place, and show, for each runner in the finish list. Payoff values may be provided for winning complex wager types such as exacta, trifecta, quinella, pick-n (where n is the number of races involved in the pick-n wager), and daily double. The payoff values may be accompanied by a synopsis of the associated finish list.

Totalisators 30 may also provide program information of the type typically provided in printed racing programs. Such program information may include early odds, early scratches, race descriptions (including the distance of each race and the race surface—grass, dirt, artificial turf, etc.), allowed class ratings (based on a fixed ratio of external criteria), purse value (payoff to winning runner), allowed age range of runners, and the allowed number of wins and starts for each runner.

If desired, some of the information provided to transaction processing and subscription management system 24 by totalisators 30 (such as the program information or other suitable racing data) may be provided by racing data collection and processing system 28. Similarly, some of the information provided to transaction processing and subscription management system 24 by racing data collection and processing system 28 may be provided by totalisators 30. Moreover, the foregoing examples of different suitable types of racing data are merely illustrative. Any suitable data related to racing may be provided to transaction processing and subscription management system 24 if desired.

Transaction processing and subscription management system 24 provides the racing data to users at user television equipment 22, user computer equipment 20, and user telephone equipment 32 for use in following race results and developing wagers. If desired, racing data may be provided to users using paths that do not directly involve transaction processing and subscription management system 24. For example, racing data may be provided from racing data collection and processing system 28 to user television equipment 22, user computer equipment 20, or user telephone equipment 32 using the Internet or other suitable communications paths.

User telephone equipment 32 may be a conventional telephone, a cordless telephone, a cellular telephone or other portable wireless telephone, or any other suitable telephone equipment. Users at user television equipment 22 and user computer equipment 20 may view information on the racing data on a television or other suitable monitor. Users at user telephone equipment 32 may listen to racing data using an interactive voice system. User telephone equipment 32 may be based on cellular telephones with displays. Users may view racing data displayed on such displays.

Users who wish to place wagers may establish an account at transaction processing and subscription management system 24. An account may also be established at one of totalisators 30. The user and the interactive wagering services may have their own bank accounts at financial institutions 38. A user may set up an account electronically by using user television equipment 22, user computer equipment 20, or user telephone equipment 32 to interact with the subscriber management functions of transaction processing and subscription management system 24. If desired, accounts may be established with the interactive wagering service with the assistance of customer service representatives at customer service facility 36. Customer service facility 36 may be at the same location as transaction processing and subscription management system 24, may be part of system 24, or may be located remote from system 24. Customer service representatives at customer service facility 36 may be reached by telephone. If user telephone equipment 32 is used to access the interactive wagering service, for example, user telephone equipment 32 may be used to reach the customer service representative using communications path 42. If user television equipment 22 or user computer equipment 20 is being used with the service, a telephone at the same location as that equipment may be used to reach the customer service representative.

The user's identity may be checked using social security number information or other identification information with the assistance of subscriber verification facility 40. The services of subscriber verification facility 40 are used to ensure that the user lives in a geographic area in which wagering is legal, that the user is of a legal age, and that the identification information (e.g., the user's social security number) matches the name provided by the user. If the user is using a cellular telephone or handheld computing device, the user's present physical location may be determined by determining which general part of the cellular telephone network is being accessed by the user or by using the cellular network or a handset-based location device such as a global positioning system (GPS) receiver in the body of the cellular telephone to pinpoint the user's location. This location information may be used to verify that the user is located in a geographic area where wagering is legal.

In a typical enrollment process, the user provides personal information to the interactive wagering service and provides funds with a credit card or funds from the user's bank account. The interactive wagering service sets up an account for the user at transaction processing and subscription management system 24 and directs one of totalisators 30 to set up a new account for the user at the totalisator. The totalisator is also directed to credit the user's account to reflect the amount of funds provided by the user. After the user places a wager and wins or loses, the totalisator adjusts the user's totalisator account to reflect the outcome of the wager. The totalisator may periodically inform the interactive wagering service of the adjusted balance in the user's account. This may be accomplished using any suitable technique (e.g., periodically, continuously, on-request, etc.). For example, reports may be collected periodically (e.g., once a day in an end-of-day report) and provided to the interactive wagering service to reconcile the account balances at transaction processing and subscription management system 24 with the account balances at totalisators 30.

If the user makes a balance inquiry, the inquiry may be passed to the appropriate totalisator by transaction processing and subscription management system 24. If the user is charged a fee for subscribing to the service, the service may debit the fee from the user's account at the transaction processing and subscription management system 24.

The accounts at totalisators 30 and transaction processing and subscription management system 24 are typically maintained separately, because the business entities that operate totalisators 30 and transaction processing and subscription management system 24 are independent. If desired, financial functions related to opening and maintaining user accounts and the like may be handled using computer equipment at another location such as one of financial institutions 38 or other location remote from totalisators 30 and system 24. Such financial functions may also be implemented primarily at a totalisator 30 or primarily at the transaction processing and subscription management system 24 if desired.

Users at user television equipment 22, user computer equipment 20, and user telephone equipment 32 may place wagers by providing wagering data and otherwise interacting with transaction processing and subscription management system 24. The interactive wagering service may provide a user at user television equipment 22, user computer equipment 20, or user telephone equipment 32 that has display capabilities with screens containing various racing data. For example, the user may be presented with screens that allow the user to view the current odds for horses in an upcoming race at a given track.

The service may provide the user with interactive screens containing menus and selectable options that allow the user to select a desired racetrack and race on which to wager. The user may also specify the type of wager in which the user is interested, the desired wager amount, and the horse(s) for the wager. When the user has finished creating the wager, the wager may be submitted to transaction processing and subscription management system 24 for processing.

The user may make selections during the creation and placing of wagers using various arrangements. With an electronic book arrangement, for example, the user may press dedicated buttons on the electronic book or may select on-screen options by touch or by using handwriting recognition. With a set-top box arrangement, the user may use a remote control or wireless keyboard to navigate the various menus and selectable options. With a personal computer, the user may use a keyboard, mouse, trackball, touch pad, or other suitable input or pointing device. With a cellular telephone with a display, the user may use buttons on the telephone. When the user has made appropriate selections to define a desired wager, the user television equipment, user computer equipment, or user telephone equipment may transmit wagering data for the wager to transaction processing and subscription management system 24.

Users with telephones may also interact with the service using an interactive voice response system located at transaction processing and subscription management system 24. The interactive voice response system may present menu options to the user in the form of audio prompts (e.g., "press 1 to select a $2 wager amount," etc.). The user may interact with the service be pressing the corresponding buttons on a touch tone telephone. User telephone equipment 32 that is based on cellular telephones allows the user to interact with the wagering service in this way. User telephone equipment 32 that is based on cellular telephones with messaging and display capabilities also allows the user to interact visually with the interactive wagering service.

The components of system 10 may be interconnected using various communications paths 44. Communications paths 44 may include satellite paths, coaxial cable paths, fiber-optic paths, twisted pair paths, other wire or cable-based links, wireless paths through free space, or any other suitable paths or combination of such paths. Communications over paths 44 may involve analog transmissions, digital transmissions, wireless transmissions, microwave transmissions, radio-frequency transmissions, optical transmissions, audio transmissions, or any other suitable type of transmissions or combination of such transmissions. Communications may involve Internet transmissions, private network transmissions, packetbased transmissions, television channel transmissions, transmissions in the vertical blanking interval of a television channel or on a television sideband, MPEG transmissions, etc. Communications may involve wireless pager or other messaging transmissions. Communications paths 44 may include cable connected to cable modems, digital subscriber lines, integrated services digital network (ISDN) lines, or any other suitable paths. Examples of suitable communications paths are described below. Those examples are, however, merely illustrative. Any of the communications path arrangements described above or other suitable arrangements may be used if desired.

Communications paths that carry video and particularly uncompressed analog video or lightly-compressed or full-screen digital video generally use more bandwidth than communications paths that carry only data or that carry partial-screen digital video. For example, if it is desired to transmit high-quality simulcasts of races from racetracks 12 to video production system 14, analog or digital videos may be transmitted from racetracks 12 to video production system 14 over path 44a using satellite links. Video may be transmitted from studio 16 to video production system 14 over path 44b using a satellite link or a high-speed terrestrial path such as a fiber-optic path. Studio 16 may also be located at the same site as video production system 14, thereby avoiding the need for a long-haul transmission path. Videos may be transmitted from video production system 14 to user computer equipment 20 over path 44c using a modem link (using, for example, a digital subscriber line, a telephone network link, a wireless link etc.) The modem link may be made over a private network.

A user with a cable modem may connect a personal computer or other user computer equipment 20 to an associated cable system headend using path 44d. (The headend in such an arrangement would be one of the television distribution facilities 18 shown in FIG. 1.) The user may then receive videos from the headend via cable modem. Videos may be provided to the headend over path 44e using a network link, fiber optic links, cable links, microwave links, satellite links, etc. A user with a set-top box or similar device (shown in FIG. 1 as user television equipment 22) may also receive videos from a cable system headend using a cable modem or other such communications device over path 44f. In addition, a user with user television equipment may receive videos over the Internet or a private network using a telephone-based modem or other such communications device using path 44g. In a system with distributed processing, interactive wagering services may be provided using a television distribution facility 18 that includes equipment that supplements or replaces at least some of the equipment at transaction processing and subscription management system 24.

If desired, user television equipment 22 or user computer equipment 20 may receive analog or digital videos from an associated television distribution facility over the communications paths normally used to distribute television programming (e.g., paths 44f and 44d). For example, videos may be received as part of a dedicated interactive wagering service television channel. If videos are provided as digital signals (e.g., MPEG signals), 10 or more digital videos may be carried on a single analog channel (or one digital video may be carried on one-tenth of the bandwidth of an analog channel). If the videos are not full-screen videos, even more videos may be simultaneously provided without a loss of image quality.

Racing videos may be provided to user telephone equipment 32 over a partially-wireless telephone Internet link or other telephone link using path 44n.

If desired, racing data may accompany the racing videos along any of these paths. Moreover, racing videos may be provided by routing them directly from racetracks 12 to user television equipment 22, user computer equipment 20 (e.g., over the Internet or a private network, etc.), or user telephone equipment 32. Racing videos may also be provided by routing them through transaction processing and subscription management system 24. If a cellular telephone or portable computing device has sufficient display capabilities to support moving images, racing videos may be displayed. Such videos may be provided using any suitable path, such as a direct path from racetracks 12, a path through video production system 14 or other suitable video processing equipment, through a hub such as transaction processing and subscription management system 24, etc. Racing videos may be provided in real time or may be recorded for later distribution. Videos that are not provided in real-time may be downloaded by user television equipment 22, user computer equipment 20, a cellular telephone, or other suitable user equipment at a lower data rate than would otherwise be required and may be downloaded in the background if desired. Such videos may also be provided to the user at real-time video rates for direct viewing by the user.

Racing data and other information related to the interactive wagering service may be provided to users over paths connected to transaction processing and subscription management system 24. For example, racing data and other data for the service may be provided to user computer equipment 20 over path 44h using a modem link. Path 44h may be a private network path or an Internet path. Path 44h may use telephone lines, digital subscriber lines, ISDN lines, wireless data paths, or any other suitable type of communications links. User television equipment 22 may receive data for the wagering service over communications path 44i, which may be a telephone line, digital subscriber line, ISDN line, or other suitable type of communications path and which may use a private network path or an Internet path, etc.

Data for the wagering service may be provided to users of the interactive wagering application via communications path 44j and paths 44f and 44d. Communications path 44j may be provided over a private network, using the public telephone network, using satellite links, or any other suitable type of links. Data from paths such as path 44*j* may be routed to paths such as paths 44*f* and 44*d* directly by associated television distribution facilities 18, or may be buffered at television distribution facilities 18 if desired. Paths 44*f* and 44*d* may include coaxial cable and use of paths 44*f* and 44*d* may involve the use of cable modems or the like. If data is provided over path 44*j* and path 44*f* or path 44*d* using an Internet protocol, a web browser or similar software running on user television equipment 22 or user computer equipment may be used to access the data. Such software may be integrated into the interactive wagering application or may be used separately. Software may also be used to view videos and may be used on other platforms (e.g., advanced cellular telephones) if desired.

The communications paths 44*k* that are used to connect various other components of the system typically do not carry high-bandwidth video signals. Accordingly, paths 44*k* may be telephone-like paths that are part of the Internet or a private network. Such paths and various other paths 44 may be dedicated connections for security, reliability, and economy.

User telephone equipment 32 may receive information for the wagering service via path 44*m*. If user telephone equipment 32 is a standard (noncellular) telephone, such information may be in the form of audio prompts ("press 1 to place a wager") and audio racing data ("the current win odds for horse 2 are 5-1"). Transaction data processing and subscription management system 24 may contain interactive voice response equipment that provides such information to the user and that responds to touch-tone signals from the user when the user responds to prompts by pressing buttons on the user's telephone.

If user telephone equipment 32 is a cellular telephone, racing data and other information for the interactive wagering service may be provided to the user by using a cellular wireless connection as part of path 44*m*. Users with cellular telephones may be provided with audio prompts using an interactive voice response system located at transaction processing and subscription management system 24 to which the users may respond by pressing cellular telephone buttons to generate touch-tone signals.

Racing data and other information for the interactive wagering service may be provided to cellular telephones in the form of alphanumeric messages. Such messages may be transmitted to the user by using paging or other alphanumeric messaging formats or any other suitable data communications scheme. If desired, data may be provided to the cellular telephones over the voice channel and decoded by the cellular telephone using modem circuitry or other suitable circuitry. Data may also be provided using any other suitable cellular or wireless path. Regardless of the way in which racing data and other information for the interactive wagering service are provided to the cellular telephone, such information may be provided to the user by displaying it on the cellular telephone display screen or by presenting it in audible form through the speaker of the cellular telephone.

Racing data and other interactive wagering service information for the users may be provided in one or more continuous data streams, may be provided periodically (e.g., once per hour or once per day), or may be provided using a client-server arrangement in which data is requested by a client processor (e.g., user television equipment 22, user computer equipment 20, user telephone equipment 32, or any other such equipment) from a server (e.g., a server implemented using computer equipment 26 at transaction processing and subscription management system 24 or computer equipment at another suitable location). Videos may also be provided using any of these techniques.

A return communications path between the user and the interactive wagering service may be used to allow the user to place wagers and otherwise interact with the interactive wagering service. For example, a user with a standard telephone or a cellular telephone may interact with the service by pressing touch-tone keys on the telephone in response to audio prompts provided by an interactive voice response system at transaction processing and subscription management system 24. If desired, users may call customer service representatives at customer service facility 36 and place wagers with manual assistance. The user of a cellular telephone may interact with the wagering service by selecting menu options and otherwise interacting with information displayed on the cellular telephone. When a selection is made, software implemented on the telephone may be used to assist the user in transmitting appropriate data (e.g., wagering data) to the wagering service. Such data may be transmitted using any suitable technique. For example, data may be transmitted using a wireless data link that is separate from the cellular voice channels. Data may also be transmitted over the voice channel (e.g., using a modem built into the cellular telephone, by automatically generating touch-tone signals that may be recognized by the interactive voice response system at transaction processing and subscription management system 24, or using any other suitable arrangement). These approaches may be used even if the user receives racing data and other information for the service using a platform other than a telephone-based platform.

Users with user television equipment 22 may interact with the service by sending data (e.g., wager data) to transaction processing and subscription management system 24 using path 44*i* or using paths 44*f* and 44*j*. Users with user computer equipment 20 may send data (e.g., wager data) to transaction processing and subscription management system 24 via path 44*h* or paths 44*d* and 44*j*. Users at any user equipment may send data for the service to locations other than transaction processing and subscription management system 24. For example, the user may provide information directly to customer service facility 36, etc.

If desired, the user may send data to the service at transaction processing and subscription management system 24 using different paths than those used to receive data from transaction processing and subscription management system 24. For example, racing data may be received at user television equipment 22 via paths 44*j* and 44*f*, whereas data may be sent by the user from user television equipment 22 to transaction processing and subscription management system 24 using path 44*i*, etc. Moreover, the paths used to receive certain video information may be different from those used to receive racing data. For example, user television equipment 22 may receive racing videos using path 44*f*, but may receive racing data using path 44*i*. These examples are merely illustrative. Any suitable combination of paths may be used to distribute racing data and other information for the interactive wagering service, any suitable combination of paths may be used to receive videos, and any suitable combination of paths may be used to send data to the wagering service.

If desired, the user may interact with the wagering service using more than one platform. For example, the user may place a wager using a cellular telephone while the user is driving home. When the user arrives home, the user may determine the outcome of the wager by watching a video of the race on user television equipment. Later in the day, the user may check the user's account balance using a personal computer. This is merely an illustrative example. The various wagering platforms may be used in any suitable combination.

Although system 10 has been described in the context of a system that supports multiple wagering platforms, system 10 may support fewer platforms if desired. For example, aspects of the invention may be implemented using a system 10 that only supports wagering from set-top boxes. If desired, system 10 may be configured so that it does not support wagering with telephone or computer equipment. The system may support electronic books, personal computers, cellular telephones and/or handheld computing devices such as personal digital assistants, palm-sized computers, etc. in combination with any other suitable platforms. Moreover, the system may be applied to any suitable type of interactive television application including video-on-demand applications, interactive television program guides, home banking applications, home shopping applications, game applications (e.g., multiplayer gaming applications, etc.), Internet browsing applications, etc.

The features of the present invention are described herein primarily in the context of an interactive wagering application implemented on user equipment such as a set-top box connected to a television. This is only illustrative. An interactive wagering application implemented on any suitable platform (user computer equipment, user television equipment, user telephone equipment, etc.) may be used to provide such features if desired. In set-top box arrangements, on-screen options may be made larger than they appear in computer-based arrangements to accommodate the greater viewing distance from which televisions are typically operated. Options may be selected by highlighting them using remote control arrow keys and by pressing an appropriate key such as an OK or enter or select key. In personal computer arrangements, on-screen options may be selected by clicking on a desired link or option using a mouse or other pointing device. In cellular telephone arrangements and handheld computer arrangements, options and information may be displayed using smaller screens than are typically available on personal computer or set-top box arrangements. To accommodate the smaller screen size, options that might otherwise be presented on a single screen may be displayed using multiple screens or layered menus. Options may be selected by highlighting them using navigation keys and pressing an appropriate select button on the cellular telephone or handheld computing device or by using a pen-based interface or the like.

The interactive wagering application may be implemented using application software that runs primarily on user television equipment, user computer equipment, user telephone equipment, or another local platform, or using a remote server or other computer that is accessed from the local platform. Arrangements in which interactive wagering services are implemented using software on remote computers that is accessed on-demand from local platforms may be referred to as client-server arrangements. Such client-server arrangements may be used to allow client processes on set top boxes or other platforms to access server processes running on servers located at cable system headends or other television distribution facilities 18 (FIG. 1). Regardless of the type of system architecture or platform used, the software that supports the interactive wagering service features described herein may be referred to as an interactive wagering application. Software that supports the graphics features of the present invention in contexts including interactive wagering and other applications (e.g., interactive television applications other than wagering-based interactive television applications) may be referred to as an interactive television application.

In a set-top box environment, the system may allow the user to launch an interactive wagering application by selecting a menu option in an interactive television program guide or other set-top box application or menu. If desired, the interactive wagering application (or other application) may be launched automatically whenever the user tunes to a particular channel (e.g., the television wagering channel). After the user has tuned to this channel, the system may display an interactive icon on the user's television screen that indicates that the interactive wagering application is available. If the user presses an "OK" remote control key, the system may launch the application.

In a computer-based system, the user may access the interactive wagering application by browsing to an Internet web site or a site on a private network or by otherwise connecting to computing equipment such as computing equipment 26 of transaction processing and subscription management system 24 (FIG. 1) or other suitable computer equipment.

Systems based on cellular telephones or the like may be launched by selecting an appropriate on-screen menu option presented on the display of the cellular telephone.

When the user is watching television (i.e., the interactive wagering application is not running or is running in the background), the user may be provided with automatically-generated graphics displays. Such graphics may be displayed surrounding special video windows or as overlays on top of the existing video on the user's monitor. For example, if the user is watching television on a television set, the graphics may be displayed by the set-top box on top as an overlay on top of the current television program to which the user is tuned.

As an example, the user may be watching a racing-related video on a television wagering service. In particular, the user may be watching a racing-related video on a wagering-related television channel. The user may be presented with a graphics display that relates to the television content of the wagering service. Any suitable graphics may be displayed including handicapping information, advertisements and promotional information related to wagers, information on race results, information on track conditions and weather, information on news, etc.

Figure 2A:
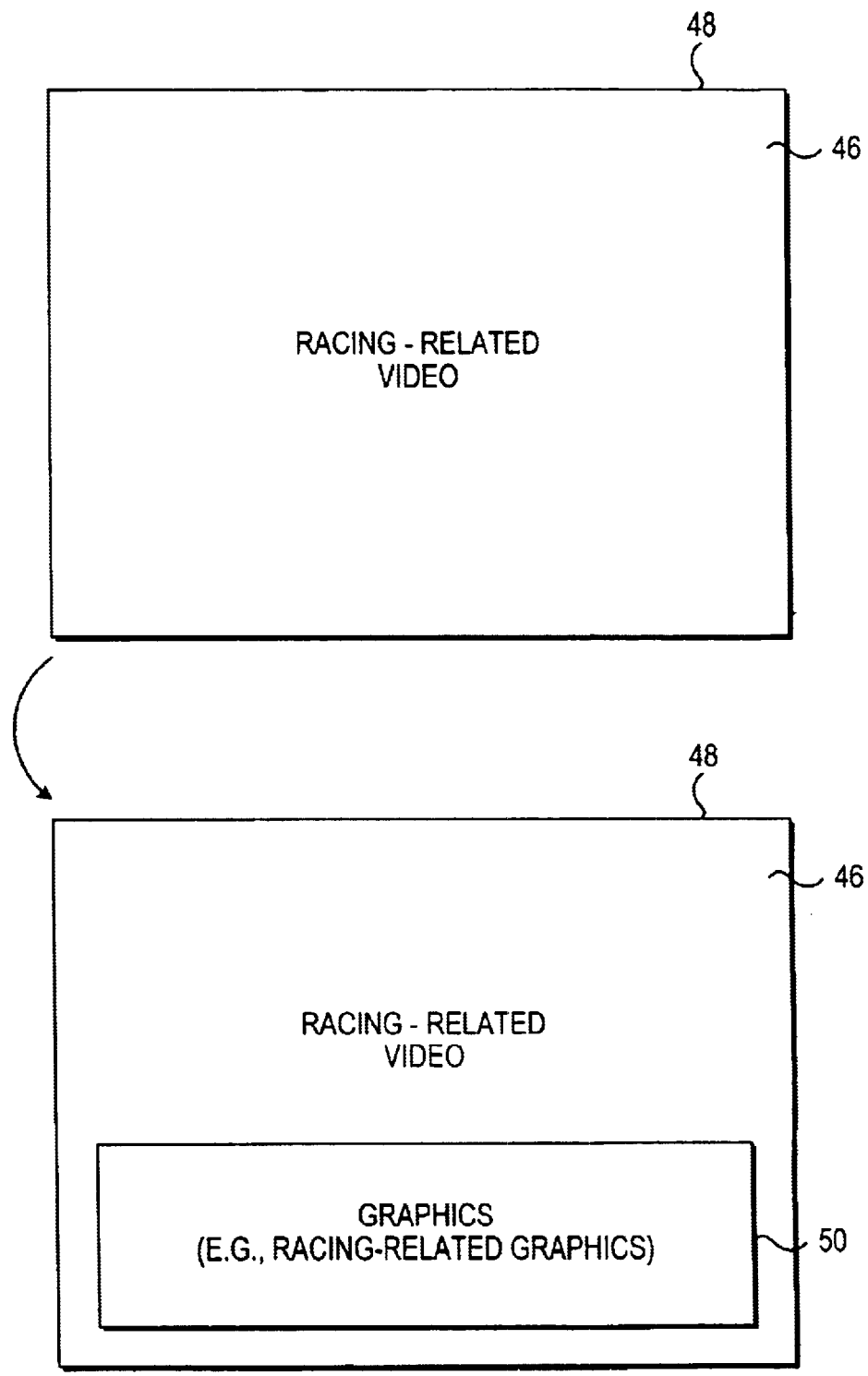
FIG. 2a shows illustrative screens that may be provided when presenting graphics to the user in accordance with the present invention.

An illustrative arrangement is shown in FIG. 2a. Initially, the user may be viewing a video on the user's equipment (e.g., user television equipment 22, user computer equipment 20, or user telephone equipment 32). For example, the user may be viewing a racing-related television program on a racing-related television channel. A full-sized racing-related video 46 may be displayed on screen 48, as shown in the upper half of FIG. 2a. During a lull in the programming or at any other suitable time, graphics 50 may be displayed, as shown in the lower half of FIG. 2a. Graphics 50 may, for example, be displayed as an overlay on top of video 46.

Figure 2B:
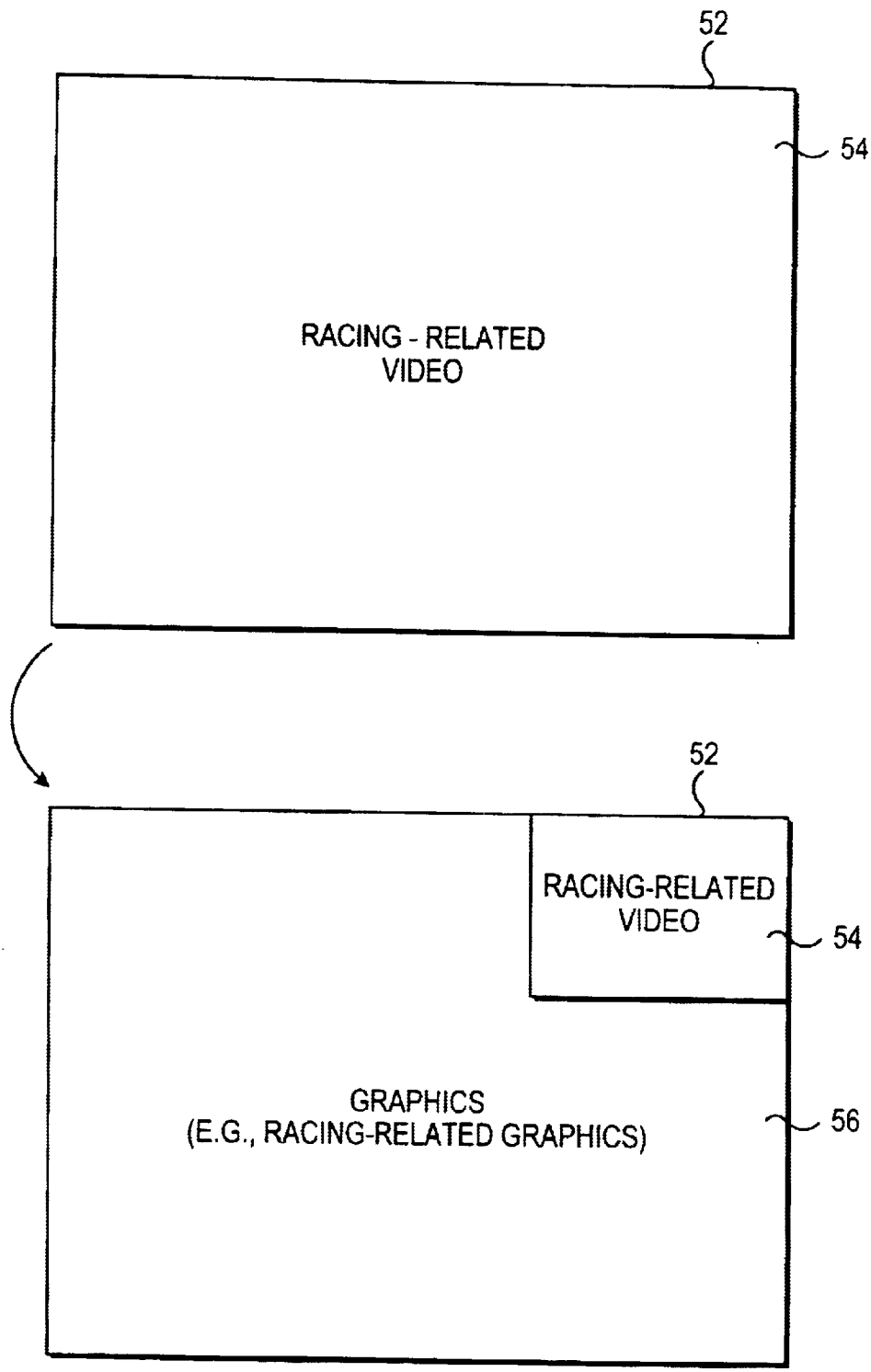
FIG. 2b shows other illustrative screens that may be provided when presenting graphics to the user in accordance with the present invention.

Another suitable arrangement is shown in FIG. 2b. With the arrangement of FIG. 2b, the user may initially be watching television. A racing-related video 54 may be displayed on screen 52, as shown in the upper half of FIG. 2b. During a lull in the programming or at any other suitable time, graphics 56 may be displayed, as shown in the lower half of FIG. 2b. Graphics 56 may, for example, be displayed in a wrap-around format. Video 54 may be displayed in a reduced-size window at the same as graphics 56.

The arrangements of FIGS. 2a and 2b are merely illustrative. Any suitable approach may be used for displaying graphics information for the user when the user is watching video. Graphics may be presented on any suitable portion of the user's screen, may be presented in any suitable size, may be displayed as an overlay or in a window, etc. Moreover, the video may be displayed in any suitable portion of the user's screen, may be displayed in any suitable size, may be hidden from view completely (with or without muting the associated audio or replacing the associated audio with another suitable audio track, etc.).

If desired, the graphics information that is displayed may include text. For example, handicapping statistics or the like may be displayed. Graphics information may also include images (e.g., moving or still animations, digital images, etc.). Although the graphics information preferably contains graphics, portions of the graphics information may also include video (e.g., short video clips or the like).

The graphics that are displayed for the user may be related to the content of the video being displayed on the user's screen. For example, if the current video being displayed for the user is a race-video of race 2 at the racetrack Churchill Downs, the graphics that are displayed may be related to race 2, may be related to Churchill Downs, may be related to one of the jockeys or horses in race 2, etc.

The display of graphics for the user may be controlled by a television producer at (for example) video production system 14, may be controlled by the user, or by any other suitable entity. The entity controlling the display of the graphics may communicate with the user's equipment to direct the user's equipment to display the graphics. If desired, software running at the user's equipment (e.g., an interactive wagering application) may be configured to automatically display the graphics. These are merely illustrative examples. Any suitable arrangement for ensuring that the graphics are displayed may be used if desired.

Figure 3:
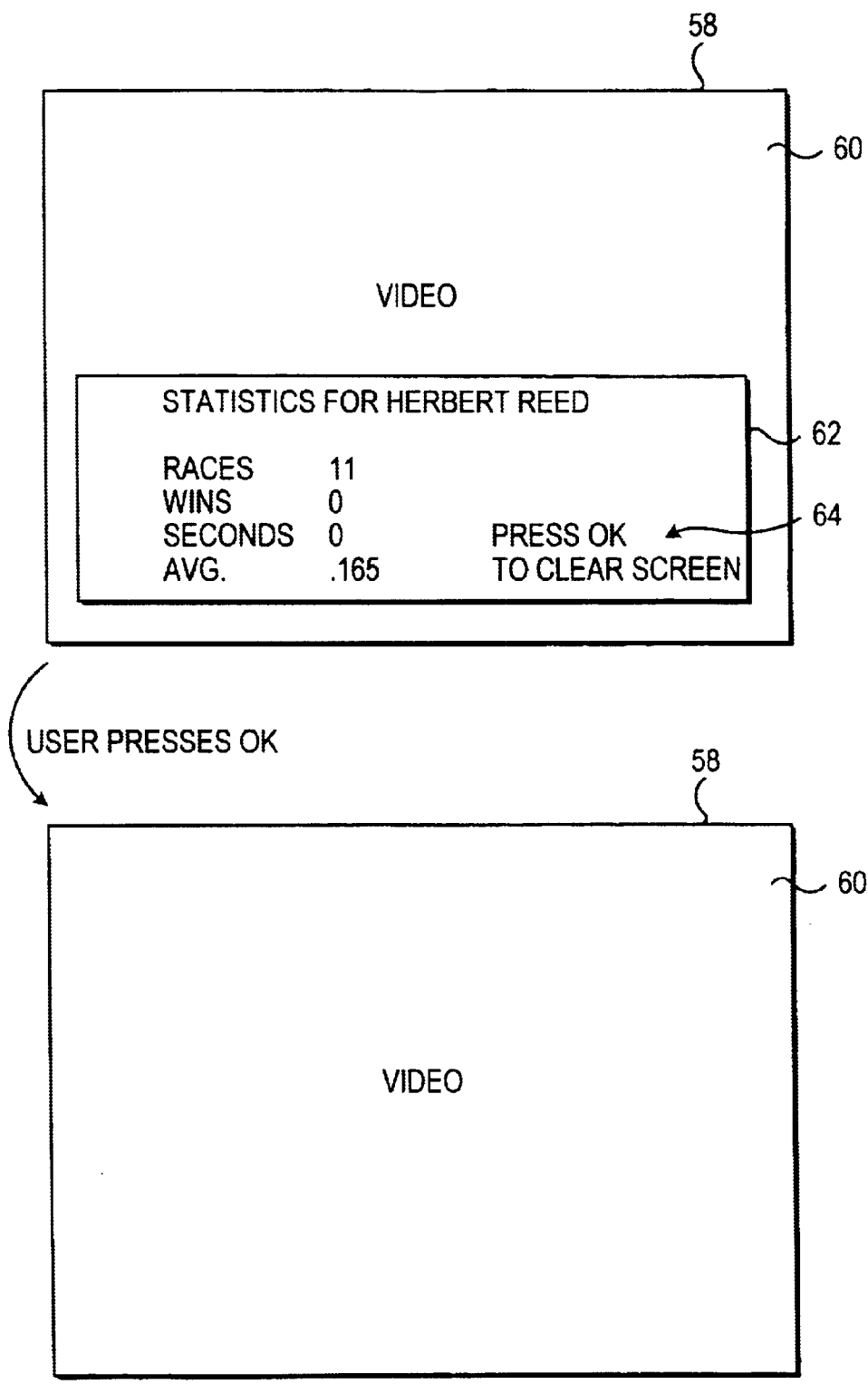
FIG. 3 shows an illustrative screen with graphics that the user may remove in accordance with the present invention.

FIG. 3 shows an illustrative arrangement involving the display of jockey statistics. As shown in the upper half of FIG. 3, the user may initially be watching a video 60 displayed on screen 58 of the user's equipment (e.g., the user's television). The video 60 may be any suitable video (e.g., a racing-related video on a racing-related channel or the like). At any suitable time (e.g., during a lull in the programming 60), graphics 62 may be displayed for the user, as shown in the upper half of FIG. 3.

The graphics 62 may contain information 64 informing the user that the user may press a remote control OK key to remove the graphics 62 from screen 58. The remote control OK key is merely an illustrative example of the type of key or option that the user may select in order to remove graphics 62 from screen 58. For example, the user may press an enter or select key or a cancel or exit key on a remote control. If the user is controlling a personal computer using a pointing device (e.g., a mouse), the user may click on an on-screen option to remove graphics 62. If graphics 62 are displayed on a cellular telephone, the user may press any suitable telephone navigation button to remove graphics 62. If desired, the user's equipment may respond to voice commands. With this type of configuration, the user may remove graphics 62 from screen 58 by issuing an appropriate voice command. These are merely illustrative examples. Any suitable arrangement may be used to cancel the display of the graphics on the user's equipment if desired.

Canceling the display of graphics 62 allows the user to resume watching video 60. This type of interactive graphics display therefore provides the user with a degree of control over the user's television content that might otherwise not be available.

Figure 4:
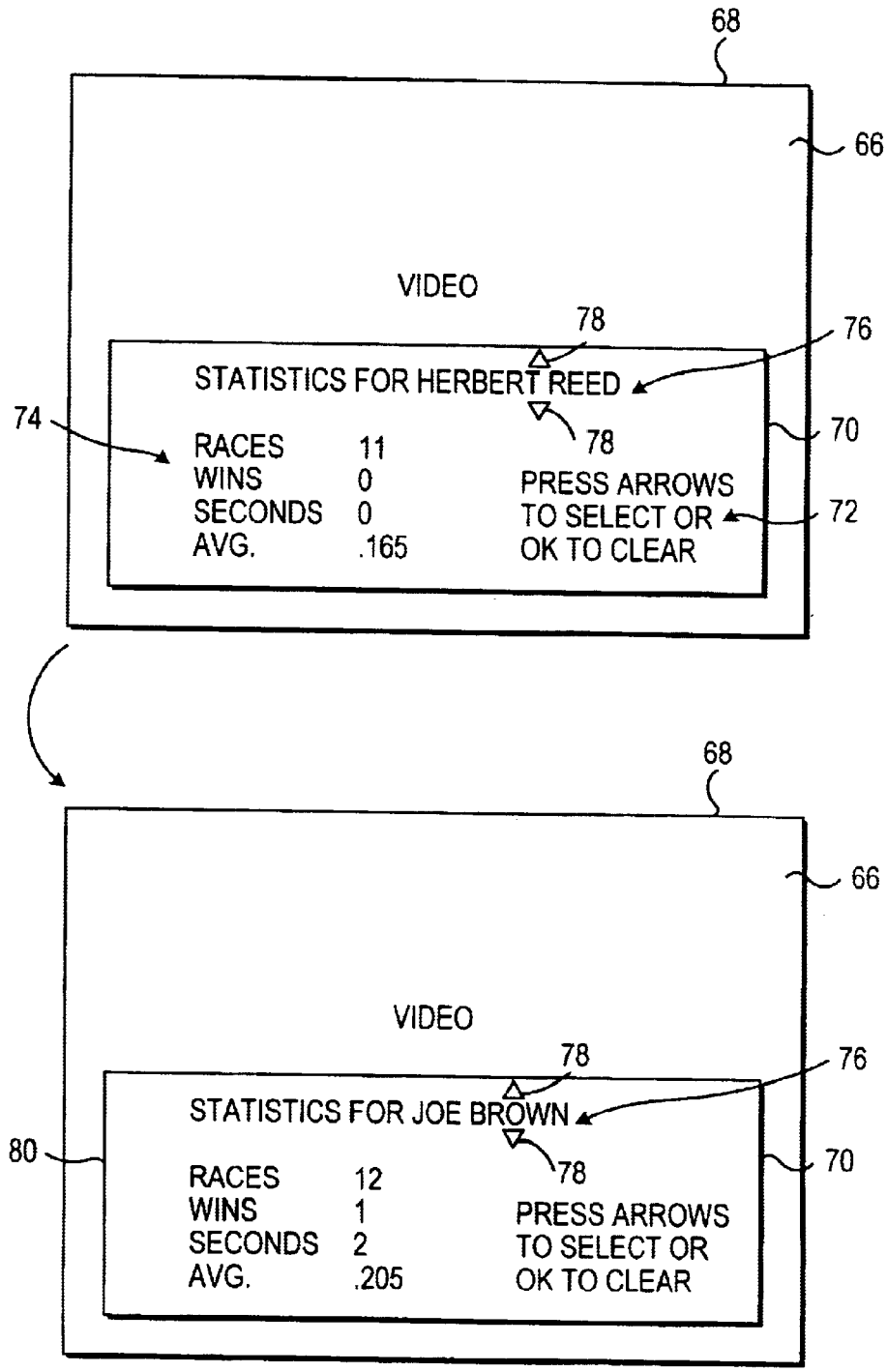
FIG. 4 shows illustrative screens that may be provided to the user that the user may interact with in accordance with the present invention.

The user may also be provided with an opportunity to interact more fully with the content of the graphics that are displayed, as shown in FIG. 4. As shown in the upper half of FIG. 4, initially, while the user is watching a video 66 on screen 68 (e.g., a racing-related television program or the like), the user may be presented with graphics 70. Graphics 70 may contain information 72 that indicates which button or option the user may select to clear graphics 70 from screen 68. Information 72 may also instruct the user how to use up and down remote control arrow keys or other suitable navigation keys or options or the like to view different information.

In the example of FIG. 4, graphics region 70 includes statistical information 74 on a jockey 76. As indicated by up and down on-screen arrows 78, the user may press remote control up and down arrow keys to direct the user's set-top box or other user equipment to display graphics 70 containing information on another jockey. This is shown in the lower screen 68 of FIG. 4. In graphics region 70 in the lower half of FIG. 4, statistics 80 are presented for a different jockey 76 ("Joe Brown").

Graphics region 70 may be used to display any suitable information. Graphics region 70 may, for example, display weather information for a nearby racetrack, the racetrack at which the user most recently placed a wager, a racetrack being discussed by the commentators on the racing-related television channel, horse statistics, racetrack statistics, race information, handicapping information such as information on recent wins, places and shows, information on pool amounts, information on horse owners, horse jockeys, race conditions, past performances etc.

The arrangement of FIG. 4 is merely illustrative. The user may interact with the displayed graphics in any suitable way. For example, the user may navigate a highlight region to different locations of the displayed graphics, the user may move an on-screen pointer to different regions of the graphics, the user may maximize the graphics region to cover the entire screen or may minimize the graphics region so that only a small portion of the screen is covered. The graphics region may be minimized to display only an icon or the like.

Figure 5:
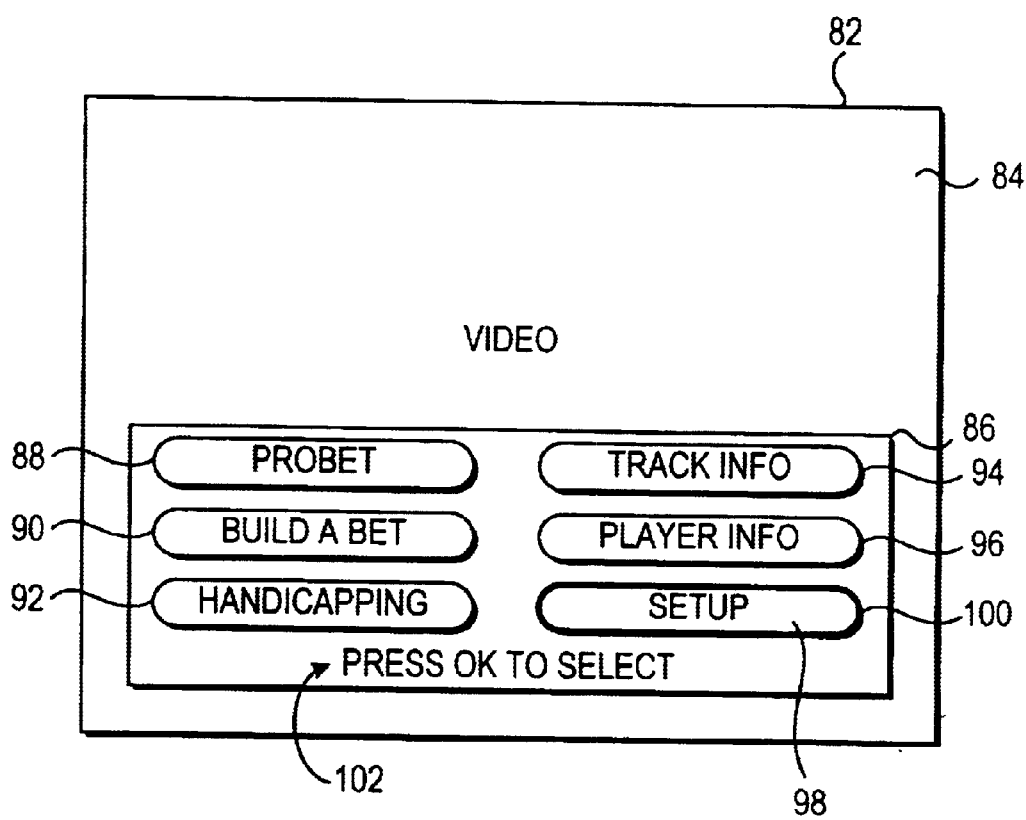
FIG. 5 shows an illustrative main menu screen that may be provided to the user in accordance with the present invention.

The user may adjust certain settings for the display using the interactive wagering application. An illustrative interactive wagering menu region 86 that may be displayed on top of a video region 84 on a display screen 82 of the user's equipment is shown in FIG. 5. Menu 86 may contain a user-selectable option 88 that the user may choose when the user desires to create a wager using an interface tailored for experienced users. Option 90 may be used to access an easy-to-use wagering interface. The user may access handicapping information by selecting option 92.

Information on various tracks may be obtained by selecting track option 94. The interactive wagering application may support multiple users. The user may access information on the different users and may adjust multiple-user settings by selecting option 96.

Setup option 98 may allow the user to adjust setup options. A highlight region 100 may be positioned on top of a desired option using remote control arrow keys or the like. The user may select option 98 or any of the other options displayed in region 86 using movable highlight region 100 to highlight a desired option and using a remote control OK key or the like to make the selection.

Region 86 may contain information 102 that informs the user that the user may select the remote control OK key (or other such key) to remove region 86 from screen 82.

Figure 6:
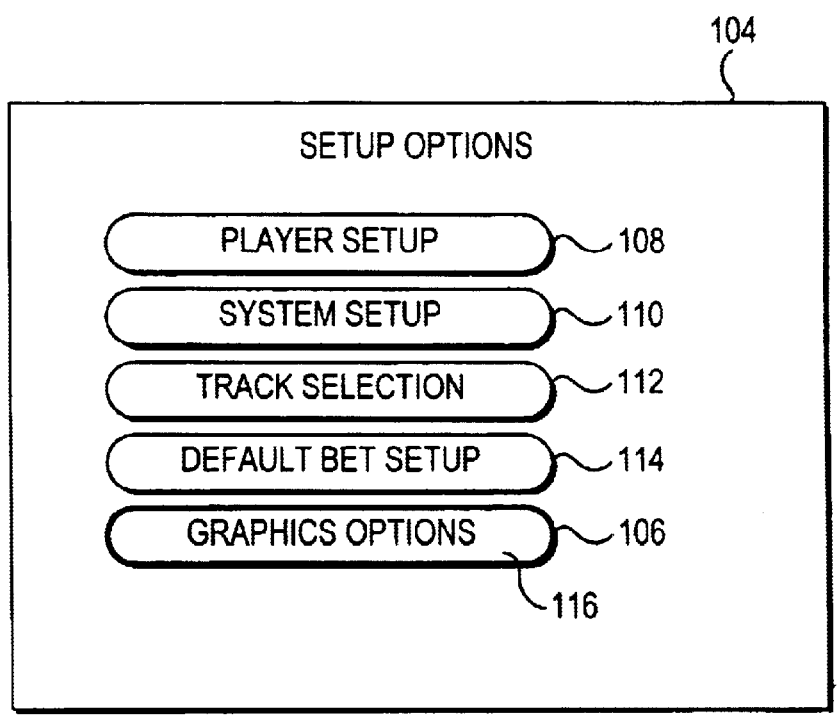
FIG. 6 shows an illustrative setup screen that may be provided to the user in accordance with the present invention.

An illustrative setup options screen 104 that may be displayed for the user when the user selects setup option 98 of FIG. 5 is shown in FIG. 6. The user may select desired options using highlight region 106 and a remote control OK key or the like.

Setup options screen 104 may include player setup option 108. The user may use player setup option 108 to manage information relating to different users. For example, an option such as option 108 may be used to add a new user, to delete a user, to change passwords, etc.

System setup option 110 may be used to configure system parameters such as equipment settings, security settings, etc.

Track selection option 112 may be used to establish user-defined or default tracks.

Option 114 may be used to set up default bet settings.

Graphics options 116 may be used to establish settings related to the display of graphics regions such as the graphics regions of FIGS. 2–4.

Figure 7:
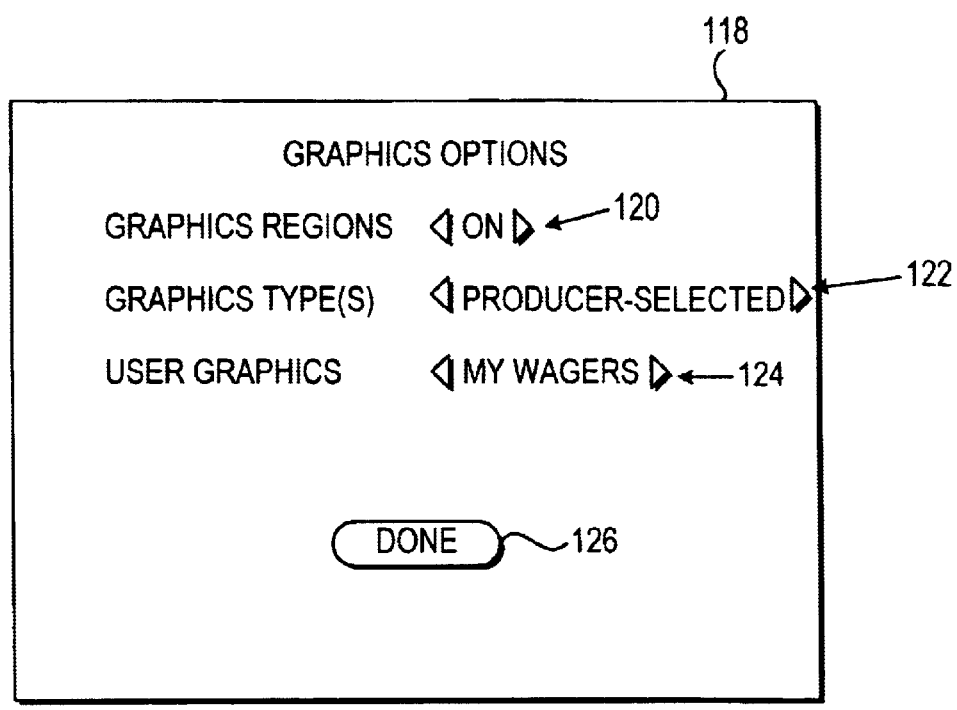
FIG. 7 is an illustrative graphics options screen that may be provided to the user in accordance with the present invention.

An illustrative graphics options setup screen 118 that may be displayed for the user when the user selects option 116 of FIG. 6 is shown in FIG. 7. The user may use a screen such as screen 118 to adjust settings that control the presentation of graphics on the user's equipment. With the illustrative arrangement of FIG. 7, settings may be adjusted by using right and left remote control arrow keys or the like to toggle between or select from various on-screen options. Any suitable arrangement may be used if desired, including on-screen buttons, drop-down menus, audio option, etc.

Screen 118 may contain a graphics regions option 120. When the user desires to receive graphics, the user may turn option 120 on. When the user does not wish to receive any graphics, the user may turn option 120 off. This type of arrangement is merely illustrative. If desired, the user may filter the graphics that are displayed depending on content, the originator of the graphics, the type of graphics regions being displayed (e.g., overlay, wrap-around, etc.), or any other suitable criteria.

One type of criteria that the user may use in filtering the graphics that are displayed relates to the identity of the entity that creates or controls the display of the graphics. For example, graphics may be displayed in response to commands from the television producer at video production system 14. The user may wish to display only such producer-created graphics or the user may only desire to display user-generated graphics (e.g., graphics that are generated based on user information such as the user's favorite horses, the user's wagers, the user's preferences, etc.). The user may also desire to display both producer-generated graphics and user-generated graphics.

If desired, an option such as option 122 may be used to allow the user to select which types of graphics are to be displayed. For example, if the user wishes to receive only producer-selected graphics (i.e., graphics that were created by the producer or that the producer directed the user's equipment to display for the user) the user may set option 122 to the "producer-selected" setting. Other selectable settings that may be provided include "user-selected" (graphics that were created by the user or that relate to user-defined content) and "producer-selected and user-selected," etc.

If the user chooses to have graphics displayed on the user's equipment that include user graphics, the user may use an option such as option 124 to select what user graphics are to be displayed. For example, the user may choose to have information on the user's recent wagers displayed, the user may choose to display statistics for the user's favorite horses, etc.

When the user has finished establishing the graphics settings to be used in displaying graphics to the user, the user may select done option 126.

Figure 8:
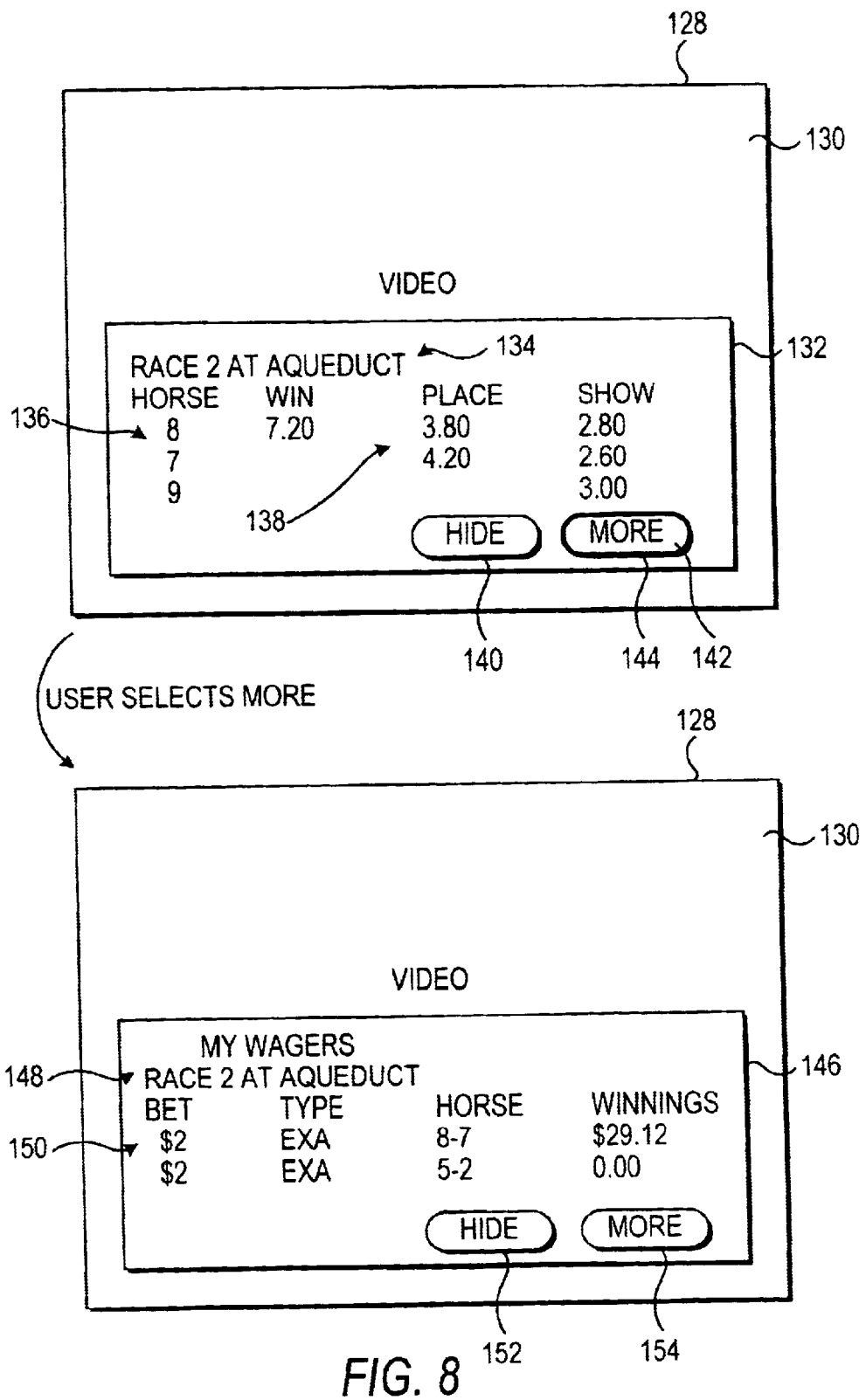
FIG. 8 shows illustrative producer-generated and user-specific screens that may be presented to the user in accordance with the present invention.

An illustrative screen 128 that contains graphics that may be displayed for the user when the user has opted to display both producer-selected and user graphics is shown in FIG. 8. As shown in the upper half of FIG. 8, screen 128 may contain a video 130 (e.g., a racing-video such as television programming for a racing-related video service or television channel).

At a suitable time (e.g., during a lull in the programming 130 or any other suitable time), producer-selected graphics 132 may be displayed for the user, as shown in the upper half of FIG. 8. The graphics 132 may include information 134 on a race at a given racetrack. The information may be, for example, race results for a recent race that has just been run at a particular track. The race results may include information 136 on the top finishing horse, and information on their finishing positions in the race. Option 140 may be selected by the user to remove graphics 132 of the upper half of FIG. 8 from screen 128. Option 142 may be selected (e.g., using highlight region 144) when the user desires to view more information.

When the user selects option 142, graphics such as the graphics in graphics region 146 may be displayed on top of video 130. Graphics 146 may include information 148 on a current race (e.g., the same race for which the graphics information 132 was displayed or for a different race, etc.). Region 146 may also include race results information 150 that is adjusted to reflect the user's recent wagers. As an example, information 150 may include wager information for the user's recent wagers including wager amount information, information on the wager type(s), horse(s), and the user's winnings for each wager. This is merely illustrative. Any suitable user-created information may be displayed as graphics information 146 if desired.

The user may hide graphics 146 from view by selecting hide option 152. The user may view additional information (e.g., additional race results, additional jockey or horse information, additional wager results and payout information, etc.) by selecting more option 154.

The foregoing arrangement allows the user to determine whether or not graphics are to be displayed (e.g., using option 120 of FIG. 7). This arrangement also allows the user to control the display of graphics based on the originator of the graphics (e.g., the company or individual creating the graphics or controlling the display of the graphic) using an option such as option 122 of FIG. 7. The user may use an option such as option 124 of FIG. 7 to select which type of user-defined content is to be displayed when the graphics being displayed involves user content. Graphics may also be displayed based on any other suitable criteria if desired.

Figure 9:
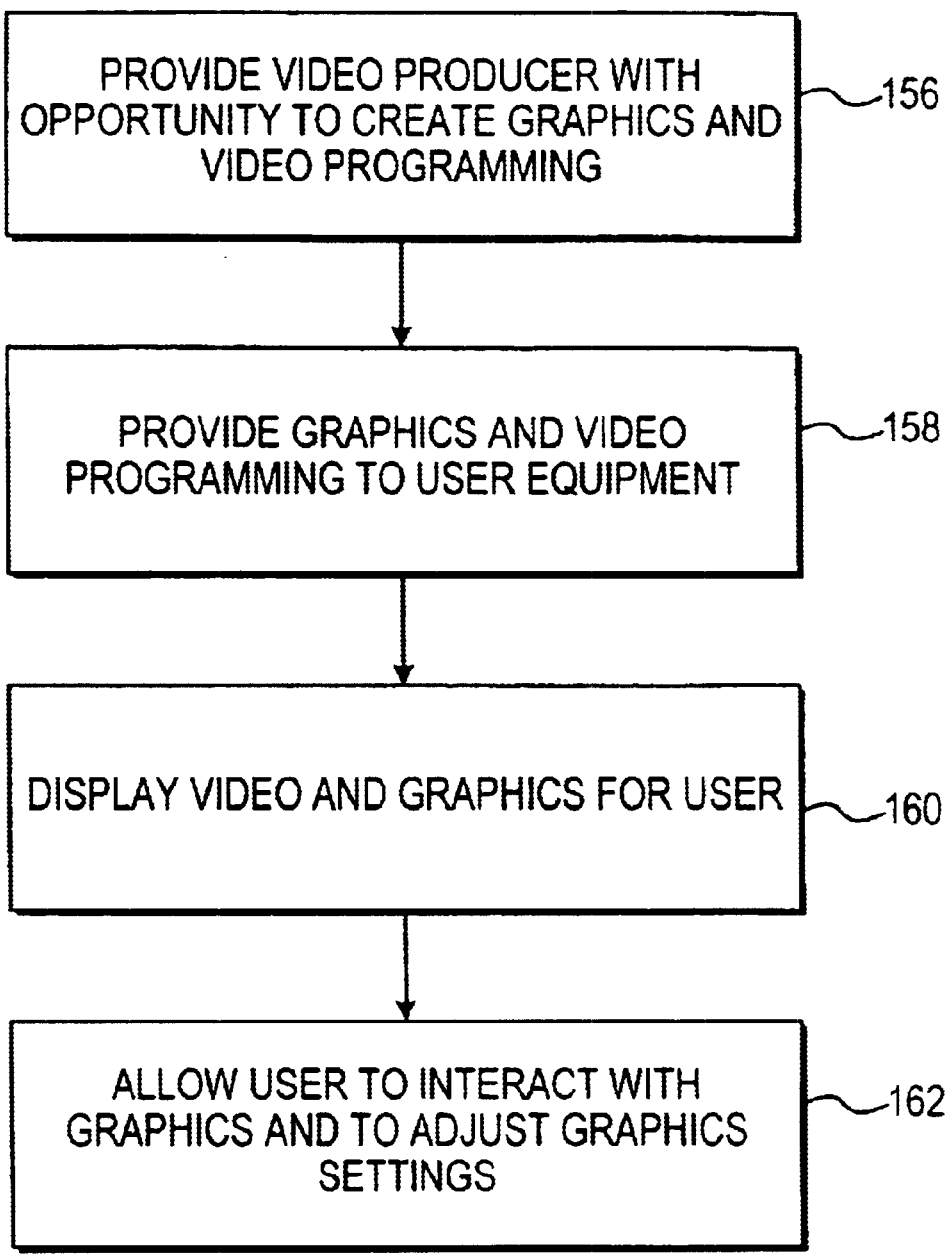
FIG. 9 is a flow chart of illustrative steps involved in providing graphics to the user in accordance with the present invention.

Illustrative steps involved in providing graphics to the user at the user's equipment are shown in FIG. 9. At step 156, a video producer at video production system 14 (FIG. 1) or other suitable facility or any other suitable entity may be provided with an opportunity to create graphics and video programming. The video programming may, for example, be racing related television programming including racing videos, jockey interviews, commentary from hosts, racing-related news, etc.

The graphics may include any suitable information (e.g., information on racing or the like) that are to be displayed for the user on the user's equipment. For example, the graphics may be graphics information on race results, handicapping information, advertising, etc.

At step 158, the graphics and video programming may be provided to the user equipment. The video programming may, for example, be transmitted to the user as an analog or digital television signal, as streaming Internet video, etc.

The graphics may be downloaded in real time (e.g., in the vertical blanking interval of a television channel, in an out-of-band channel on a television path, over the Internet, or on any suitable data path). The graphics may be downloaded continuously or semicontinuously or may be downloaded on demand (e.g., when requested by the user equipment or when directed by the video production system 14 or other equipment). These are merely illustrative examples. The graphics information may be provide to the user's equipment using any suitable arrangement if desired.

At step 160, the video and graphics may be displayed for the user. For example, the graphics may be displayed as an overlay on top of the video. If desired, the graphics may be locally-generated based on graphics information that was downloaded from video production system 14 or the like, that was provided in real time, etc. The video production system 14 or other suitable facility may send control commands in real time that direct the user's equipment to display the graphics. This approach may be used, for example, when graphics have been previously downloaded to memory in the user's equipment. The control commands may be provided in the vertical blanking interval of an analog television channel (e.g., an analog television channel that is being used by a wagering television service such as a wagering-related television channel to distribute a racing-related or wagering-related video or the like), in a digital data stream that is associated with a digital television channel (e.g., a digital television channel that is being used by a wagering television service such as a wagering-related television channel to distribute a racing-related or wagering-related video or the like), or using any other suitable transmission technique. Locally-generated graphics may also be displayed according to a predetermined schedule. A local clock in the user's equipment or any other suitable arrangement may be used to trigger the scheduled display of the graphics. These approaches are merely illustrative. Any suitable arrangement for displaying the graphics may be used if desired.

Locally-generated graphics may be displayed on top of an embedded graphics region in the video or television signal. This allows as viewers who do not have set-top boxes or the like to receive a default graphic (e.g., a national statistics or general information about wagering), whereas users who have set-top boxes may view locally-generated graphics (i.e., graphics generated by the set-top box or other user equipment).

At step 162, the user may be allowed to interact with the graphics and to adjust graphics settings. For example, graphics options screens may be presented for the user that allow the user to establish the criteria to be used in determining which graphics to be displayed for the user. The user may also select from various on-screen options or the like when the user desires to hide graphics from view or when the user desires to view additional information (e.g., additional information on a horse or jockey, etc.). The user may also interact with on-screen options that allow the user to create a wager, to place a wager, to order products, to view additional information, etc.

Figure 10:
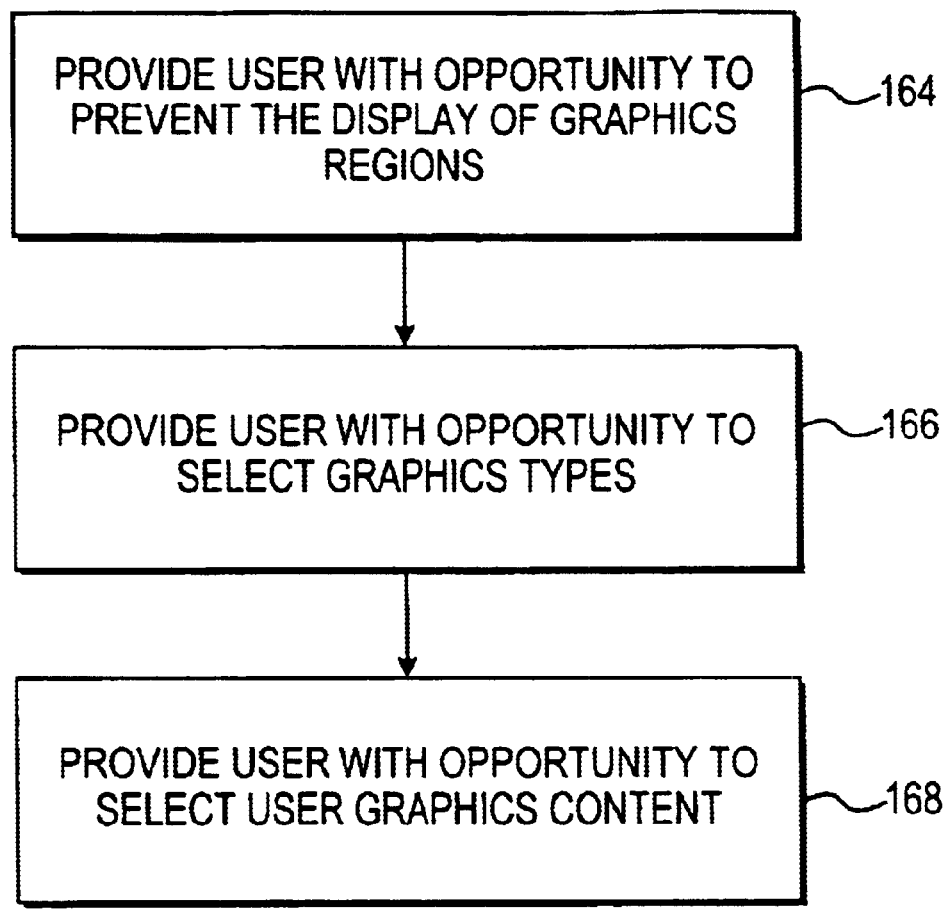
FIG. 10 is a flow chart of illustrative steps involved in allowing the user to set up graphic display options in accordance with the present invention.

Steps involved in providing the user with selectable setup options and the like are shown in FIG. 10. At step 164, the user may be provided with an opportunity to prevent the display of locally-generated graphics regions (e.g., by preventing the display of locally-generated graphics such as the graphics overlays and wrap-around graphics displays shown in the FIGS.). An option such as option 120 of FIG. 7 may be used to provide the user with an opportunity to adjust this setting.

At step 166, the user may be provided with an opportunity to select the types of graphics that may be displayed (e.g., based on the originator of the graphics). If the user chooses at step 166 to include user-specific graphics in the graphics that are displayed, the user may be provided with an opportunity to select which graphics content to display at step 168. For example, the user may determine whether to display race results for the user's recent wagers in a user's wagers region, whether to display handicapping information and other information on upcoming races at the user's favorite tracks, or whether to display other suitable user information.

The user may interact with the displayed graphics by entering commands with the user equipment. Data for generating the graphics may be provided from any suitable source such as from a remote server or other source such as video production system 14, transaction processing and subscription management system 24, or other suitable remote data source. If desired, some or all of the information used for generating the graphics may be obtained locally from the user's set-top box. For example, the user's set-top box or other user equipment may be used to store information on the user's wagers and wagering statistics, the user's preferences, the users's account balance, certain handicapping information, etc.

An application (e.g., an interactive television application, an interactive wagering application, or any other suitable application), an operating system function, or features implemented using any other suitable hardware or software configuration may be used to handle the data for the graphics and may be used to generate the graphics from the data. Such features or functions may be implemented locally (e.g., on the user's equipment), may be implemented remotely (e.g., on a remote server or the like), or may be implemented using a client-server architecture or other such distributed computing arrangement.

Although the screens shown when illustrating the graphics that may be presented to the user have sometimes been described as having been generated by a set-top box or the like, these screens may be generated by any suitable user equipment including user computer equipment such as a notebook or handheld computer, a cellular telephone with a display, or any other suitable device. Videos and graphics may be delivered to such devices over the Internet or any other suitable communications network.

The foregoing is merely illustrative of the principles of this invention and various modifications can be made by those skilled in the art without departing from the scope and spirit of the invention.

What is claimed is:

1. A method for presenting video and locally-generated graphics to a user at user equipment having a display, comprising:

providing the user with an option to select which locally-generated graphics are to be displayed;

displaying a screen containing wagering-related video on the display of the user equipment; and displaying the locally-generated graphics in the screen, wherein the locally-generated graphics are generated at the user equipment and include wagering-related information, and wherein the locally generated graphics are displayed not in response to a user input.

2. The method defined in claim 1 further is comprising providing race results in the graphics.

3. The method defined in claim 1 wherein the wagering-related information includes information on a horse race.

4. The method defined in claim 1 wherein the wagering-related information includes information on horse races and wherein the video is related to horse races.

5. The method defined in claim 1 wherein:
the video contains embedded graphics; and
the locally-generated graphics are displayed in place of at least part of the embedded graphics.

6. The method defined in claim 1 further comprising:
displaying the video in a reduced-size window in the screen when the locally-generated graphics are displayed.

7. The method defined in claim 1 further comprising displaying the video as a full-screen video before the locally-generated graphics are displayed.

8. The method defined in claim 1 further comprising providing the user with an option to select which graphics are to be displayed based on the originator of the graphics.

9. The method defined in claim 1 further comprising providing the user with an option to prevent display of the locally-generated graphics.

10. The method defined in claim 1, wherein the graphics includes information on horse owners, horse jockeys, race conditions, and past performances.

11. The method defined in claim 1 further comprising providing the user with an opportunity to use the user equipment to select which types of graphics to display as the locally-generated graphics.

12. The method defined in claim 1 further comprising allowing the user to select which type of content are to be included in the locally-generated graphics.

13. The method defined in claim 1 further comprising:
allowing the user to interact with the locally-generated graphics; and
displaying additional information when the user interacts with the locally-generated graphics.

14. The method defined in claim 1 further comprising allowing the user to interact with the locally-generated graphics.

15. The method defined in claim 1 further comprising allowing the user to interact with the locally-generated graphics using a remote control.

16. The method defined in claim 1 further comprising allowing the user to interact with the locally-generated graphics to obtain additional racing-related information.

17. The method defined in claim 1 further comprising displaying information in the locally-generated graphics on a given horse jockey and allowing the user to interact with the locally-generated graphics to obtain information on another horse jockey.

18. The method defined in claim 1 further comprising displaying the locally-generated graphics as an overlay on top of the video.

19. The method defined in claim 1 further comprising displaying an option in the locally-generated graphics that allows the user to hide the locally-generated graphics.

20. The method defined in claim 1 further comprising displaying an option in the screen that allows the user to clear the locally-generated graphics from the display.

21. The method defined in claim 1 further comprising displaying an option in the screen that allows the user to clear the locally-generated graphics from the display using a remote control.

22. The method defined in claim 1 further comprising displaying a setup options screen on the display that includes an option for setting up graphics options.

23. The method defined in claim 1 further comprising displaying a graphics horse racing statistics in the locally-generated graphics with which the user may interact using up and down remote control arrow keys.

24. The method defined in claim 1, further comprising displaying content created by a television producer associated with a video production system as part of the locally-generated graphics.

25. The method defined in claim 1, further comprising:
displaying content created by a television producer associated with a video production system as part of the locally-generated graphics; and
allowing the user to interact with the locally-generated graphics to cause the user equipment to display locally-generated graphics containing user-specified racing information as part-of the locally-generated graphics.

26. The method defined in claim 1, further comprising sending control commands to the user equipment over an analog television channel that direct the user equipment to display the locally-generated graphics.

27. The method defined in claim 1, further comprising sending control commands to the user equipment over a digital data stream associated with a digital television channel that direct the user equipment to display the locally-generated graphics.

28. The method defined in claim 1 further comprising displaying the locally-generated graphics according to a predetermined schedule.

29. The method defined in claim 1 further comprising displaying the locally-generated graphics according to a schedule based on a local clock at the user equipment.

30. The method defined in claim 1 further comprising displaying race results in the locally-generated graphics according to control commands received from a video production system.

31. The method defined in claim 1 further comprising displaying race results in the locally-generated graphics according to control commands received from a video production system, wherein the video production system provides the wagering-related video to the user equipment.

32. The method defined in claim 1 further comprising providing the wagering-related video to the user equipment from a video production system using a digital television channel.

33. The method defined in claim 1 further comprising providing the wagering-related video to the user equipment from a video production system using a digital television channel, wherein the locally-generated graphics includes race results.

34. The method defined in claim 1 further comprising providing the wagering-related video to the user equipment from a video production system using a digital television channel, wherein the locally-generated graphics includes race results, and wherein the race results are related to content in the wagering-related video.

35. The method defined in claim 1 further comprising providing the wagering-related video to the user equipment from a video production system using a digital television channel, wherein the locally-generated graphics includes race results, wherein the race results are related to content in the wagering-related video, and wherein the locally-generated video is displayed when control commands are received by the user equipment.

36. The method defined in claim 1 further comprising providing the wagering-related video to the user equipment from a video production system using a digital television channel, wherein the locally-generated graphics includes race results, wherein the race results are related to content in the wagering-related video, wherein the locally-generated video is displayed when control commands are received by the user equipment from a video production facility, and wherein the control commands are transmitted in a data stream associated with a digital television channel in which the wagering-related video is provided.

37. The method defined in claim 1 wherein the user equipment includes a set-top box, the method further comprising using the set-top box to display the locally-generated graphics.

38. The method defined in claim 1 wherein the user equipment includes a cellular telephone, the method further comprising using the cellular telephone to display the locally-generated graphics.

39. The method defined in claim 1 wherein the user equipment includes a handheld computer, the method further comprising using the handheld computer to display the locally-generated graphics.

40. The method defined in claim 1 wherein the user equipment includes a personal computer, the method further comprising using the personal computer to display the locally-generated-graphics.

41. The method defined in claim 1 wherein the user equipment includes user television equipment, the method further comprising using the user television equipment to display the locally-generated graphics.

42. The method defined in claim 1 further comprising providing the user with an opportunity to place an electronic wager using the user equipment.

43. The method defined in claim 1 further comprising sending an electronic wager to a transaction processing and subscription management system over a communications path connected to the user equipment.

44. An interactive wagering system comprising user equipment having a display, wherein the user equipment in configured to:
provide a user with an option to select which locally-generated graphics are to be displayed;
display a screen containing wagering-related video on the display of the user equipment; and
display the locally-generated graphics in the screen, wherein the locally-generated graphics are generated at the user equipment and include wagering-related information, and wherein the locally-generated graphics are displayed not in response to a user input.

45. The system defined in claim 44 wherein the user equipment is further configured to provide race results in the graphics.

46. The system defined in claim 44 wherein the wagering-related information includes information on a horse race.

47. The system defined in claim 45 wherein the wagering-related information includes information on horse races and wherein the video is related to horse races.

48. The system defined in claim 44 wherein:
the video contains embedded graphics; and
the locally-generated graphics are displayed in place of at least part of the embedded graphics.

49. The system defined in claim 44 wherein the user equipment is further configured to display the video in a reduced-size window in the screen when the locally-generated graphics are displayed.

50. The system defined in claim 44 wherein the user equipment is further configured to display the video as a full-screen video before the locally-generated graphics are displayed.

51. The system defined in claim 44 wherein the user equipment is further configured to provide the user with an option to select which graphics are to be displayed based on the originator of the graphics.

52. The system defined in claim 44 wherein the user equipment is further configured to provide the user with an option to prevent display of the locally-generated graphics.

53. The system defined in claim 44, wherein the graphics includes information on horse owners, horse jockeys, race conditions, and past performances.

54. The system defined in claim 44 wherein the user equipment is further configured to provide the user with an opportunity to use the user equipment to select which types of graphics to display as the locally-generated graphics.

55. The system defined in claim 44 wherein the user equipment is further configured to allow the user to select which type of content are to be included in the locally-generated graphics.

56. The system defined in claim 44 wherein the user equipment is further configured to:
allow the user to interact with the locally-generated graphics; and
display additional information when the user interacts with the locally-generated graphics.

57. The system defined in claim 44 wherein the user equipment is further configured to allow the user to interact with the locally-generated graphics.

58. The system defined in claim 44 wherein the user equipment is further configured to allow the user to interact with the locally-generated graphics using a remote control.

59. The system defined in claim 44 wherein the user equipment is further configured to allow the user to interact with the locally-generated graphics to obtain additional racing-related information.

60. The system defined in claim 44 wherein the user equipment is further configured to:
display information in the locally-generated graphics on a given horse jockey; and
allow the user to interact with the locally-generated graphics to obtain information on another horse jockey.

61. The system defined in claim 44 wherein the user equipment is further configured to display the locally-generated graphics as an overlay on top of the video.

62. The system defined in claim 44 wherein the user equipment is further configured to display an option in the locally-generated graphics that allows the user to hide the locally-generated graphics.

63. The system defined in claim 44 wherein the user equipment is further configured to display an option in the screen that allows the user to clear the locally-generated graphics from the display.

64. The system defined in claim 44 wherein the user equipment is further configured to display an option in the screen that allows the user to clear the locally-generated graphics from the display using a remote control.

65. The system defined in claim 44 wherein the user equipment is further configured to display a setup options screen on the display that includes an option for setting up graphics options.

66. The system defined in claim 44 wherein the user equipment is further configured to display a graphics horse racing statistics in the locally-generated graphics with which the user may interact using up and down remote control arrow keys.

67. The system defined in claim 44, wherein the user equipment is further configured to display content created by a television producer associated with a video production system as part of the locally-generated graphics.

68. The system defined in claim 44, wherein the user equipment is further configured to:
   display content created by a television producer associated with a video production system as part of the locally-generated graphics; and
   allow the user to interact with the locally-generated graphics to cause the user equipment to display locally-generated graphics containing user-specified racing information as part of the locally-generated graphics.

69. The system defined in claim 44, further comprising a facility that is configured to send control commands to the user equipment over an analog television channel that direct the user equipment to display the locally-generated graphics.

70. The system defined in claim 44, further comprising a facility that is configured to send control commands to the user equipment over a digital data stream associated with a digital television channel that direct the user equipment to display the locally-generated graphics.

71. The system defined in claim 44 wherein the user equipment is further configured to display the locally-generated graphics according to a predetermined schedule.

72. The system defined in claim 44 wherein the user equipment is further configured to display the locally-generated graphics according to a schedule based on a local clock at the user equipment.

73. The system defined in claim 44 wherein the user equipment is further configured to display race results in the locally-generated graphics according to control commands received from a video production system.

74. The system defined in claim 44 wherein the user equipment is further configured to display race results in the locally-generated graphics according to control commands received from a video production system, wherein the video production system provides the wagering-related video to the user equipment.

75. The system defined in claim 44 further comprising a video production system that is configured to provide the wagering-related video to the user equipment using a digital television channel.

76. The system defined in claim 44 further comprising a video production system that is configured to provide the wagering-related video to the user equipment using a digital television channel, wherein the locally-generated graphics includes race results.

77. The system defined in claim 44 further comprising a video production system that is configured to provide the wagering-related video to the user equipment using a digital television channel, wherein the locally-generated graphics includes race results, and wherein the race results are related to content in the wagering-related video.

78. The system defined in claim 44 further comprising a video production system that is configured to provide the wagering-related video to the user equipment using a digital television channel, wherein the locally-generated graphics includes race results, wherein the race results are related to content in the wagering-related video, and wherein the locally-generated video is displayed when control commands are received by the user equipment.

79. The system defined in claim 44 further comprising a video production system that is configured to provide the wagering-related video to the user equipment using a digital television channel, wherein the locally-generated graphics includes race results, wherein the race results are related to content in the wagering-related video, wherein the locally-generated video is displayed when control commands are received by the user equipment from a video production facility, and wherein the control commands are transmitted in a data stream associated with a digital television channel in which the wagering-related video is provided.

80. The system defined in claim 44 wherein the user equipment includes a set-top box and wherein the set-top box is used to display the locally-generated graphics.

81. The system defined in claim 44 wherein the user equipment includes a cellular telephone and wherein the cellular telephone is used to display the locally-generated graphics.

82. The system defined in claim 44 wherein the user equipment includes a handheld computer and wherein the handheld computer is used to display the locally-generated graphics.

83. The system defined in claim 44 wherein the user equipment includes a personal computer and wherein the personal computer is used to display the locally-generated graphics.

84. The system defined in claim 44 wherein the user equipment includes user television equipment and wherein the user television equipment is used to display the locally-generated graphics.

85. The system defined in claim 44 wherein the user equipment is further configured to provide the user with an opportunity to place an electronic wager.

86. The system defined in claim 44 further comprising a transaction processing and subscription management system, wherein the user equipment is further configured to send an electronic wager to the transaction processing and subscription management system over a communications path connected to the user equipment.

87. A computer readable medium encoded with machine-readable instructions for use in presenting video and locally-generated graphics to a user at user equipment having a display, the machine-readable instructions comprising:
   providing the user with an option to select which locally-generated graphics are to be displayed;
   displaying a screen containing wagering-related video on the display of the user equipment; and
   displaying the locally-generated graphics in the screen, wherein the locally-generated graphics are generated at the user equipment and include wagering-related information, and wherein the locally-generated graphics are displayed not in response to a user input.

88. The computer readable medium defined in claim 87, the machine-readable instructions further comprising providing race results in the graphics.

89. The computer readable medium defined in claim 87 wherein the wagering-related information includes information on a horse race.

90. The computer readable medium defined in claim 87 wherein the wagering-related information includes information on horse races and wherein the video is related to horse races.

91. The computer readable medium defined in claim 87 wherein:
   the video contains embedded graphics; and
   the locally-generated graphics are displayed in place of at least part of the embedded graphics.

92. The computer readable medium defined in claim 87, the machine-readable instructions further comprising:

displaying the video in a reduced-size window in the screen when the locally-generated graphics are displayed.

93. The computer readable medium defined in claim 87, the machine-readable instructions further comprising displaying the video as a full-screen video before the locally-generated graphics are displayed.

94. The computer readable medium defined in claim 87, the machine-readable instructions further comprising providing the user with an option to select which graphics are to be displayed based on the originator of the graphics.

95. The computer readable medium defined in claim 87, the machine-readable instructions further comprising providing the user with an option to prevent display of the locally-generated graphics.

96. The computer readable medium defined in claim 87, wherein the graphics includes information on horse owners, horse jockeys, race conditions, and past performances.

97. The computer readable medium defined in claim 87, the machine-readable instructions further comprising providing the user with an opportunity to use the user equipment to select which types of graphics to display as the locally-generated graphics.

98. The computer readable medium defined in claim 87, the machine-readable instructions further comprising allowing the user to select which type of content are to be included in the locally-generated graphics.

99. The computer readable medium defined in claim 87, the machine-readable instructions further comprising:
allowing the user to interact with the locally-generated graphics; and
displaying additional information when the user interacts with the locally-generated graphics.

100. The computer readable medium defined in claim 87, the machine-readable instructions further comprising allowing the user to interact with the locally-generated graphics.

101. The computer readable medium defined in claim 89, the machine-readable instructions further comprising allowing the user to interact with the locally-generated graphics using a remote control.

102. The computer readable medium defined in claim 87, the machine-readable instructions further comprising allowing the user to interact with the locally-generated graphics to obtain additional racing-related information.

103. The computer readable medium defined in claim 87, the machine-readable instructions further comprising displaying information in the locally-generated graphics on a given horse jockey and allowing the user to interact with the locally-generated graphics to obtain information on another horse jockey.

104. The computer readable medium defined in claim 87, the machine-readable instructions further comprising displaying the locally-generated graphics as an overlay on top of the video.

105. The computer readable medium defined in claim 87, the machine-readable instructions further comprising displaying an option in the locally-generated graphics that allows the user to hide the locally-generated graphics.

106. The computer readable medium defined in claim 87, the machine-readable instructions further comprising displaying an option in the screen that allows the user to clear the locally-generated graphics from the display.

107. The computer readable medium defined in claim 87, the machine-readable instructions further comprising displaying an option in the screen that allows the user to clear the locally-generated graphics from the display using a remote control.

108. The computer readable medium defined in claim 87, the machine-readable instructions further comprising displaying a setup options screen on the display that includes an option for setting up graphics options.

109. The computer readable medium defined in claim 87, the machine-readable instructions further comprising displaying a graphics horse racing statistics in the locally-generated graphics with which the user may interact using up and down remote control arrow keys.

110. The computer readable medium defined in claim 87, the machine-readable instructions further comprising displaying content created by a television producer associated with a video production system as part of the locally-generated graphics.

111. The computer readable medium defined in claim 87, the machine-readable instructions further comprising:
displaying content created by a television producer associated with a video production system as part of the locally-generated graphics; and
allowing the user to interact with the locally-generated graphics to cause the user equipment to display locally-generated graphics containing user-specified racing information as part of the locally-generated graphics.

112. The computer readable medium defined in claim 87, the machine-readable instructions further comprising sending control commands to the user equipment over an analog television channel that direct the user equipment to display the locally-generated graphics.

113. The computer readable medium defined in claim 87, the machine-readable instructions further comprising sending control commands to the user equipment over a digital data stream associated with a digital television channel that direct the user equipment to display the locally-generated graphics.

114. The computer readable medium defined in claim 87, the machine-readable instructions further comprising displaying the locally-generated graphics according to a predetermined schedule.

115. The computer readable medium defined in claim 87, the machine-readable instructions further comprising displaying the locally-generated graphics according to a schedule based on a local clock at the user equipment.

116. The computer readable medium defined in claim 87, the machine-readable instructions further comprising displaying race results in the locally-generated graphics according to control commands received from a video production system.

117. The computer readable medium defined in claim 87, the machine-readable instructions further comprising displaying race results in the locally-generated graphics according to control commands received from a video production system, wherein the video production system provides the wagering-related video to the user equipment.

118. The computer readable medium defined in claim 87, the machine-readable instructions further comprising providing the wagering-related video to the user equipment from a video production system using a digital television channel.

119. The computer readable medium defined in claim 87, the machine-readable instructions further comprising providing the wagering-related video to the user equipment from a video production system using a digital television channel, wherein the locally-generated graphics includes race results.

120. The computer readable medium defined in claim 87, the machine-readable instructions further comprising providing the wagering-related video to the user equipment from a video production system using a digital television channel, wherein the locally-generated graphics includes race results, and wherein the race results are related to content in the wagering-related video.

121. The computer readable medium defined in claim 87, the machine-readable instructions further comprising providing the wagering-related video to the user equipment from a video production system using a digital television channel, wherein the locally-generated graphics includes race results, wherein the race results are related to content in the wagering-related video, and wherein the locally-generated video is displayed when control commands are received by the user equipment.

122. The computer readable medium defined in claim 87, the machine-readable instructions further comprising providing the wagering-related video to the user equipment from a video production system using a digital television channel, wherein the locally-generated graphics includes race results, wherein the race results are related to content in the wagering-related video, wherein the locally-generated video is displayed when control commands are received by the user equipment from a video production facility, and wherein the control commands are transmitted in a data stream associated with a digital television channel in which the wagering-related video is provided.

123. The computer readable medium defined in claim 87 wherein the user equipment includes a set-top box, the machine-readable instructions further comprising using the set-top box to display the locally-generated graphics.

124. The computer readable medium defined in claim 87 wherein the user equipment includes a cellular telephone, the machine-readable instructions further comprising using the cellular telephone to display the locally-generated graphics.

125. The computer readable medium defined in claim 87 wherein the user equipment includes a handheld computer, the machine-readable instructions further comprising using the handheld computer to display the locally-generated graphics.

126. The computer readable medium defined in claim 87, wherein the user equipment includes a personal computer, the machine-readable instructions further comprising using the personal computer to display the locally-generated graphics.

127. The computer readable medium defined in claim 89 wherein the user equipment includes user television equipment, the machine-readable instructions further comprising using the user television equipment to display the locally-generated graphics.

128. The computer readable medium defined in claim 87, the machine-readable instructions further comprising providing the user with an opportunity to place an electronic wager using the user equipment.

129. The computer readable medium defined in claim 87, the machine-readable instructions further comprising sending an electronic wager to a transaction processing and subscription management system over a communications path connected to the user equipment.

* * * * *